US009921686B2

(12) United States Patent
Chen

(10) Patent No.: US 9,921,686 B2
(45) Date of Patent: Mar. 20, 2018

(54) LEARNING METHOD AND INFORMATION PROCESSING APPARATUS

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/249,951

(22) Filed: Aug. 29, 2016

(65) Prior Publication Data

US 2017/0090676 A1 Mar. 30, 2017

(30) Foreign Application Priority Data

Sep. 28, 2015 (JP) .................................. 2015-189463

(51) Int. Cl.
*G06F 3/042* (2006.01)
*G06F 3/041* (2006.01)

(52) U.S. Cl.
CPC .......... *G06F 3/0421* (2013.01); *G06F 3/0416* (2013.01); *G06F 3/0425* (2013.01); *G06F 2203/04104* (2013.01)

(58) Field of Classification Search
CPC .... G06F 3/0421; G06F 3/0425; G06F 3/0416; G06F 2203/04104
See application file for complete search history.

(56) References Cited

U.S. PATENT DOCUMENTS

| 2008/0044080 | A1 | 2/2008 | Li | |
|---|---|---|---|---|
| 2014/0139463 | A1* | 5/2014 | Seo | G06F 3/0416 345/173 |
| 2014/0294233 | A1* | 10/2014 | Osamura | G06T 7/0075 382/103 |
| 2015/0261303 | A1* | 9/2015 | Tanaka | G06F 3/04883 345/156 |
| 2015/0302617 | A1* | 10/2015 | Shimura | G06K 9/00355 345/441 |

FOREIGN PATENT DOCUMENTS

| JP | 2007-307358 | 11/2007 |
|---|---|---|
| JP | 2012-8936 | 1/2012 |

* cited by examiner

*Primary Examiner* — Premal Patel
(74) *Attorney, Agent, or Firm* — Oblon, McClelland, Maier & Neustadt, L.L.P.

(57) ABSTRACT

A learning method includes collecting, from a sensor that measures a distance and a direction to an object, measurement data regarding a plurality of points forming the object, generating, based on the measurement data, first shape data indicating a shape of the object, calculating a number of first cusps in the first shape data, the first cusps corresponding to cusps of the object, generating second shape data in which the shape is simplified by removing a part of the plurality of points from the measurement data, calculating a number of second cusps in the second shape data, and generating learning information based on the number of the first cusps and the number of the second cusps, the learning information classifying a type of the shape of the object into one of a plurality of types.

20 Claims, 32 Drawing Sheets

LEARNING METHOD AND INFORMATION PROCESSING APPARATUS

CROSS-REFERENCE TO RELATED APPLICATION

This application is based upon and claims the benefit of priority of the prior Japanese Patent Application No. 2015-189463, filed on Sep. 28, 2015, the entire contents of which are incorporated herein by reference.

FIELD

The embodiment discussed herein is related to a technology for receiving a touch operation performed on a display surface.

BACKGROUND

There is a technology for detecting an operation by detecting a touching action of a user without using a pointing device. To detect a touching action performed by the user, a flat surface near a display surface is scanned in some cases.

Related technologies are disclosed in, for example, Japanese Laid-open Patent Publication Nos. 2007-307358 and 2012-8936.

SUMMARY

According to an aspect of the invention, a learning method includes collecting, from a sensor that measures a distance and a direction to an object, measurement data regarding a plurality of points forming the object, generating, based on the measurement data, first shape data indicating a shape of the object, calculating a number of first cusps in the first shape data, the first cusps corresponding to cusps of the object, generating second shape data in which the shape is simplified by removing a part of the plurality of points from the measurement data, calculating a number of second cusps in the second shape data, and generating learning information based on the number of the first cusps and the number of the second cusps, the learning information classifying a type of the shape of the object into one of a plurality of types.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A pointing device is used on the assumption that the location of one point is designated, but a method for detecting a touching action of a user is free from this assumption. In other words, a mode of a user's touch on a display surface is not limited to a touch with one finger. If the type of touch with a plurality of fingers is correctly distinguished, this leads to an increase of modes of an instruction operation.

However, a classifier for correctly distinguishing the type of touch is not easily generated.

An aspect of an embodiment is provided to more correctly distinguish the type of touch on a display surface.

Figure 1:
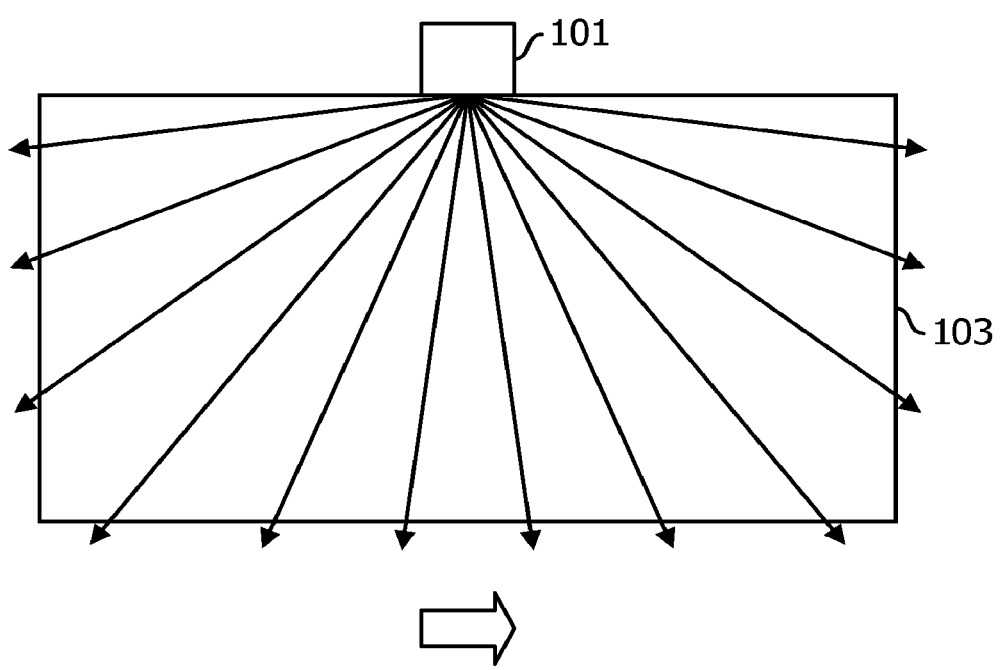
FIG. 1 illustrates how scanning is performed.

FIG. 1 illustrates how scanning is performed on a display system. In this example, a display surface 103 is placed vertically. However, the display surface 103 may be placed in another manner (for example, the display surface 103 may be placed horizontally facing upward). If a display device is a display, the surface of the display corresponds to the display surface 103. If the display device is a projector, the screen surface on which an image is projected corresponds to the display surface 103.

In this example, a planar scan sensor 101 is disposed in the center of an upper side of the rectangular display surface 103. However, the planar scan sensor 101 may be disposed on a left, right, or lower side of the display surface 103.

As illustrated in FIG. 1, the planar scan sensor 101 emits a scan beam over the display surface 103 in a wide-angle detection range and detects the location of a touch on the display surface 103. The scan beam is emitted in a predetermined angle range every 25 milliseconds, for example. Note that the scan beam is, for example, approximately 2 cm from the display surface 103. Accordingly, the location of the touch is not strictly detected, but judgment of the touch on the display surface 103 is performed based on the detected shape.

In this example, the type of touch includes a touch with one finger and a touch with a plurality of fingers, and the touches are discriminated from each other. An operation corresponding to the type of touch is received.

Figure 2:
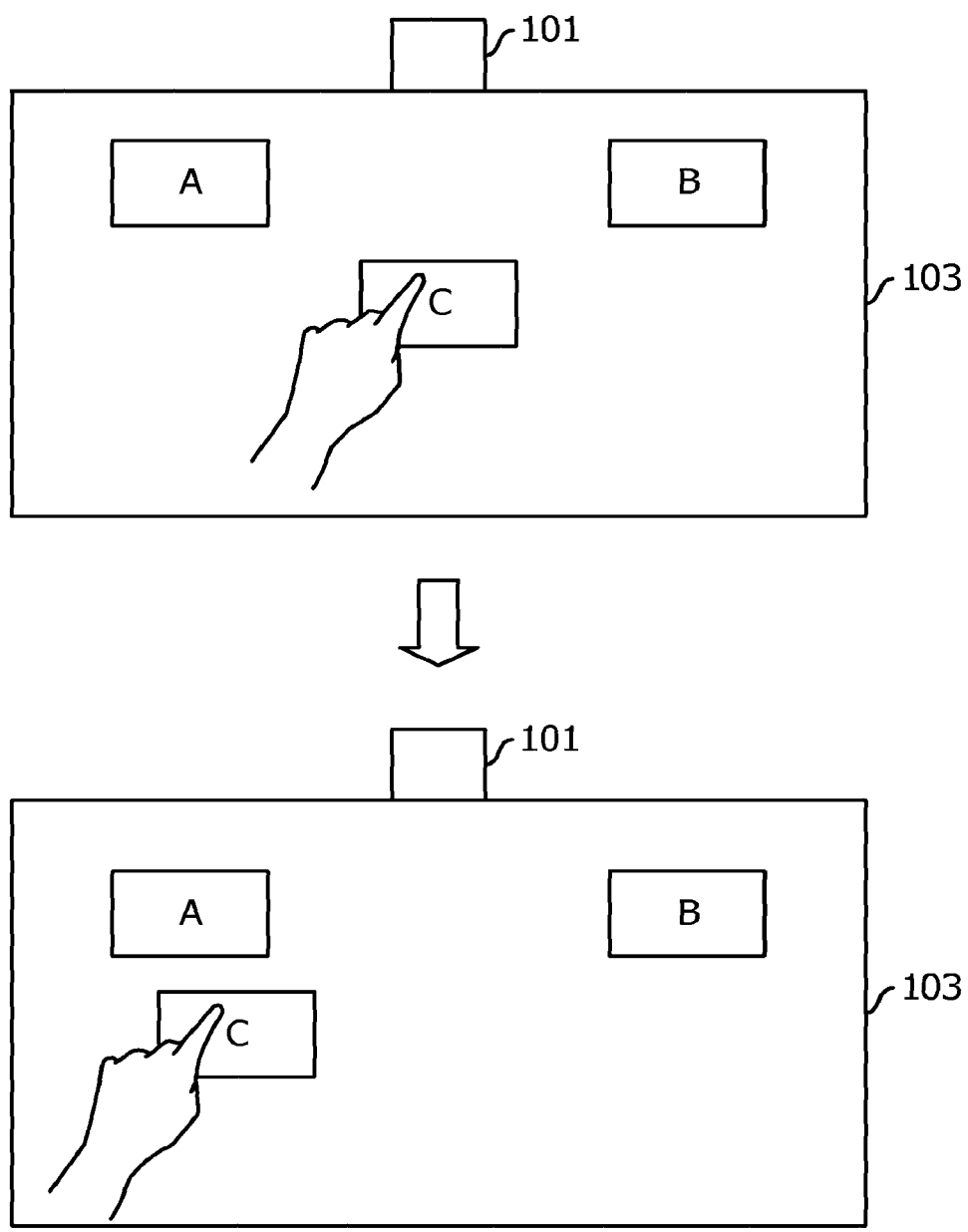
FIG. 2 is a diagram illustrating an example touch operation performed using one finger.

FIG. 2 illustrates an example touch operation performed using one finger. As illustrated in FIG. 2, icons A, B, and C are displayed on the display surface 103. If the icon C is touched with one finger, and if the finger on the icon C is moved leftwards, only the icon C is slid leftwards.

Figure 3:
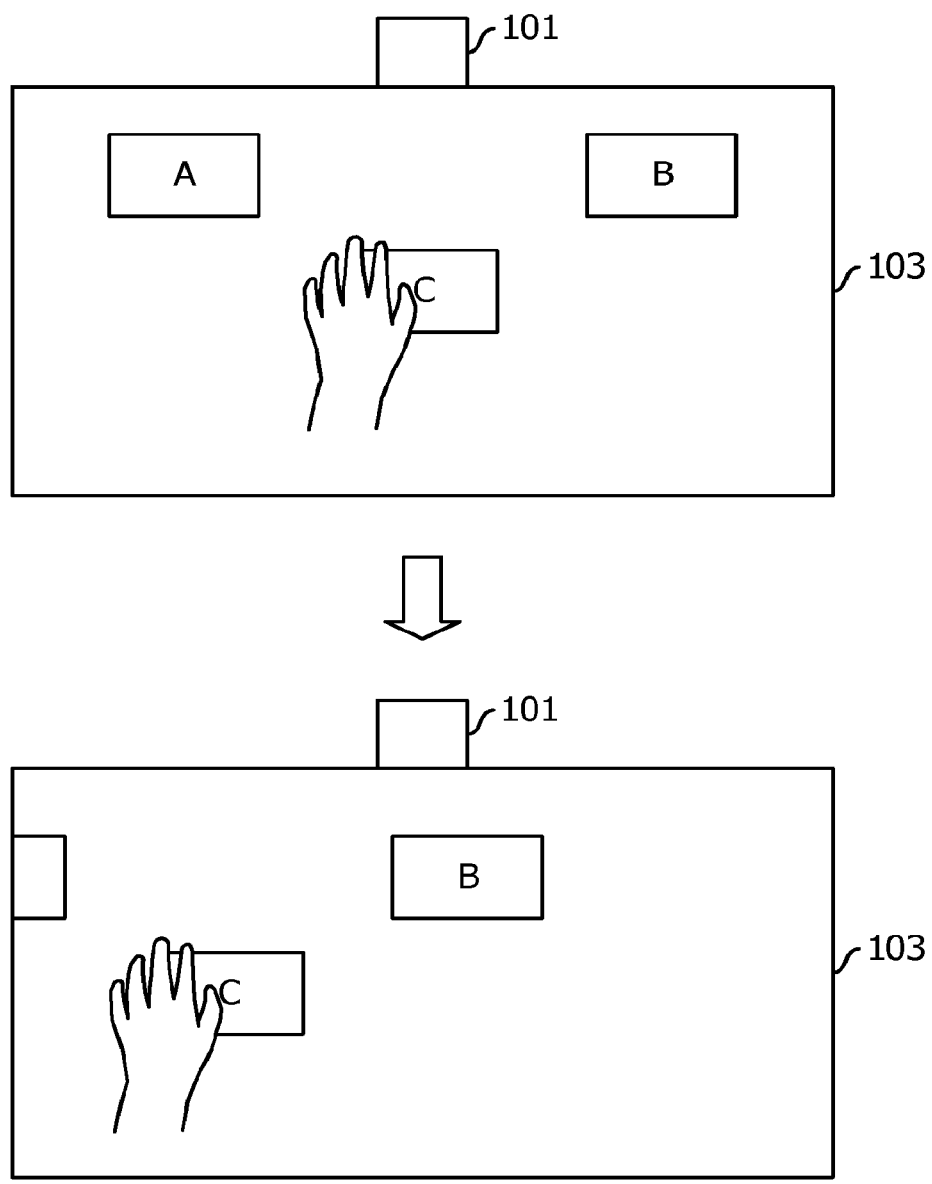
FIG. 3 is a diagram illustrating an example touch operation performed using a plurality of fingers.

FIG. 3 illustrates an example touch operation performed using a plurality of fingers. Also in FIG. 3, the icons A, B, and C are displayed on the display surface 103. If the icon C is touched with the plurality of fingers (for example, four fingers excluding the thumb), and if the fingers on the icon C are moved leftwards, the screen as a whole is scrolled leftwards.

These types of touch are distinguished based on data indicating the shape detected by the planar scan sensor 101 (hereinafter, referred to as shape data)

Figure 4:
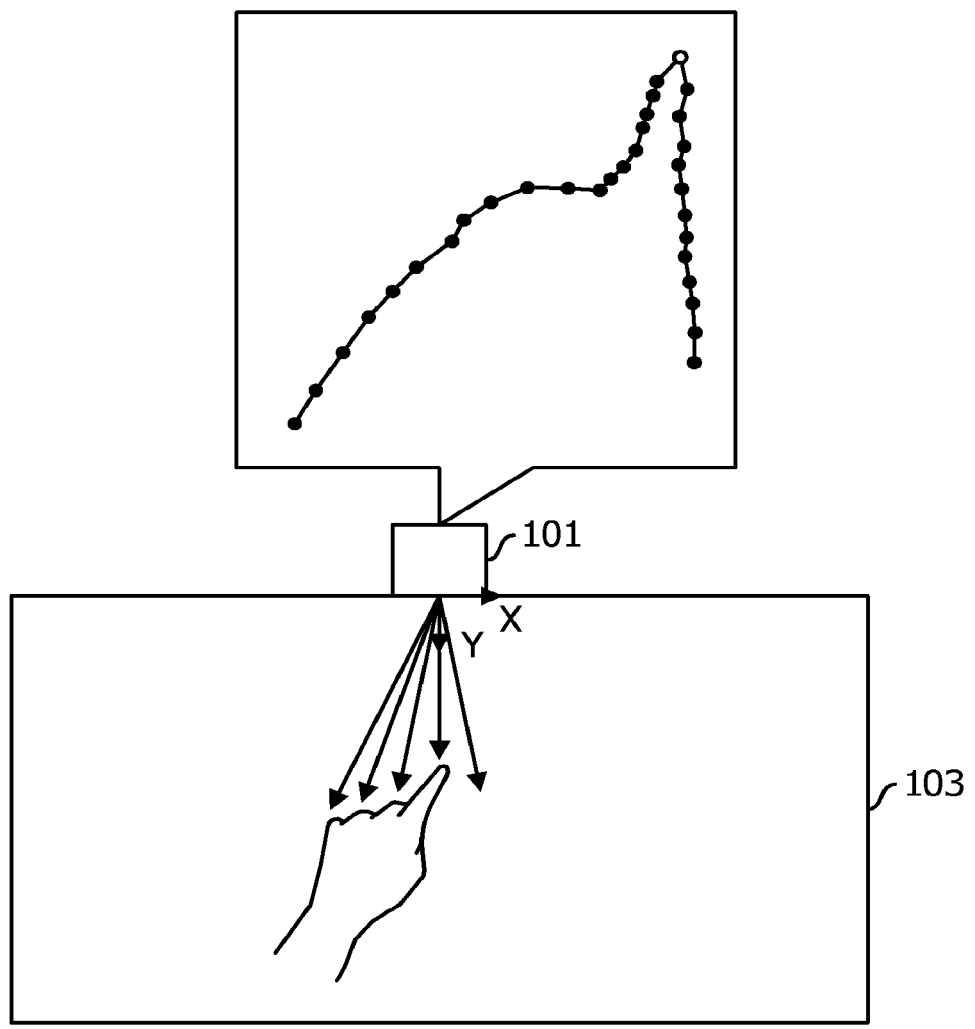
FIG. 4 is a diagram illustrating example shape data based on a touch with one finger.
Figure 5:
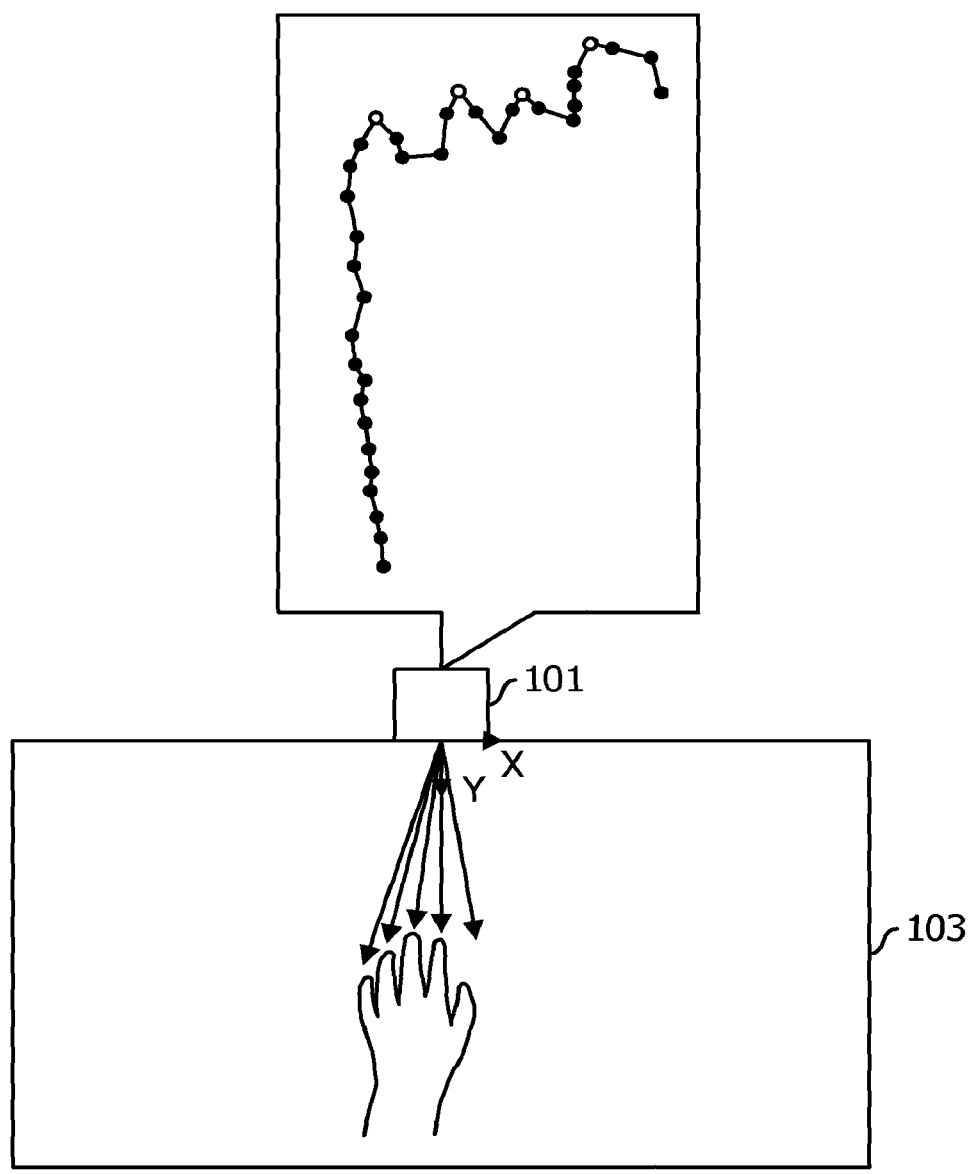
FIG. 5 is a diagram illustrating example shape data based on a touch with a plurality of fingers.

If the display surface 103 is touched with one finger, shape data as illustrated in FIG. 4 is obtained. If the display surface 103 is touched with a plurality of fingers, shape data as illustrated in FIG. 5 is obtained. Note that the measurement data obtained from the planar scan sensor 101 indicates angles and distances. In this example, the measurement data is converted into X:Y coordinates to thereby obtain the shape data. For example, the origin is located at the center of the upper side of the display surface 103. The forward direction of the X-axis is a rightward direction, and the forward direction of the Y-axis is a downward direction.

Figure 6:
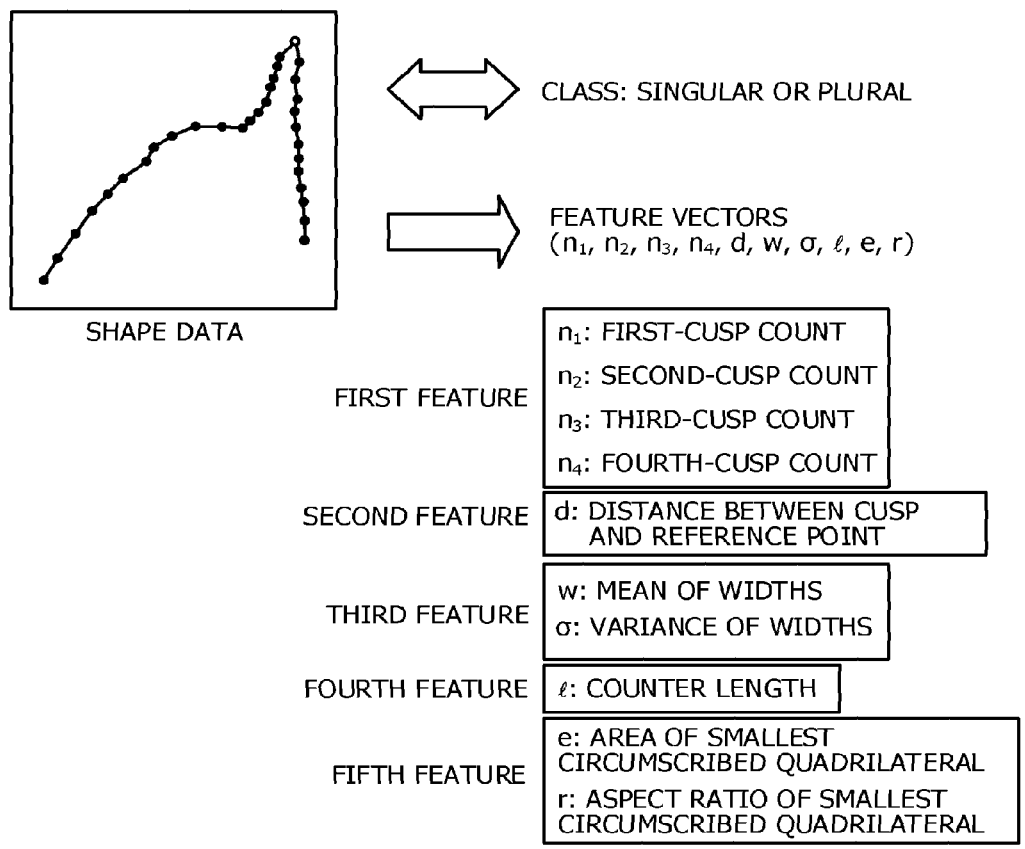
FIG. 6 is a diagram illustrating an example sample.

In an embodiment, a plurality of samples is collected, and a learning process based on the samples is performed to thereby obtain classifiers for judging the type of touch. FIG. 6 illustrates an example sample. The sample according to the embodiment includes shape data, at least one class, and feature vectors. The class corresponds to the type of touch. The feature vectors have elements of feature amounts calculated from the shape data.

In this example, the feature vectors include a first-cusp count, a second-cusp count, a third-cusp count, a fourth-cusp count, distance between a cusp and a reference point, mean of widths, variance of widths, contour length, area of the smallest circumscribed quadrilateral, and aspect ratio of the smallest circumscribed quadrilateral. Of these, a combination of the first-cusp count, the second-cusp count, the third-cusp count, and the fourth-cusp count is referred to as a first feature. The distance between the cusp and the reference point is referred to as a second feature. A combination of the mean of widths and the variance of widths is referred to as a third feature. The contour length is referred to as a fourth feature. A combination of the area of the smallest circumscribed quadrilateral and the aspect ratio of the smallest circumscribed quadrilateral is referred to as a fifth feature. The feature amounts described above will be described in detail later. Note that the feature vectors and the class of data included in the sample are used in the learning process. The learning process will be described later by using FIG. 30. The outline of the embodiment has heretofore been described.

Figure 7:
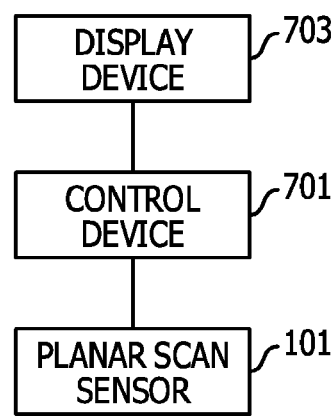
FIG. 7 is a diagram illustrating an example configuration of a display system.

FIG. 7 illustrates a configuration example of the display system. A control device 701 controls the planar scan sensor 101 and a display device 703. Specifically, the control device 701 causes the planar scan sensor 101 to detect the location of an object near the display surface 103. The control device 701 also causes the display device 703 to display a screen image. The display device 703 is, for example, a display or a projector.

Figure 8:
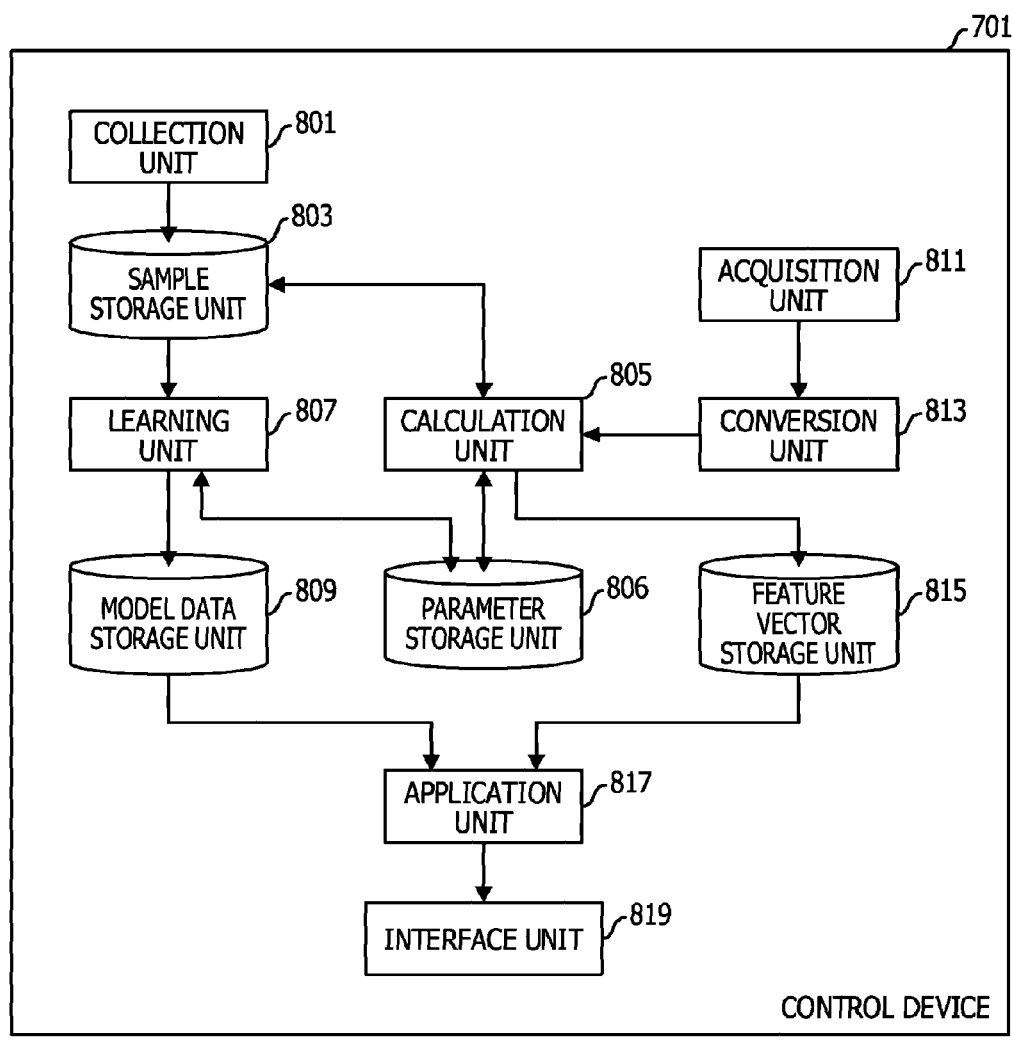
FIG. 8 is a diagram illustrating an example module configuration of a control device.

FIG. 8 illustrates an example module configuration of the control device 701. The control device 701 includes a collection unit 801, a sample storage unit 803, a calculation unit 805, a parameter storage unit 806, a learning unit 807, a model data storage unit 809, an acquisition unit 811, a conversion unit 813, a feature vector storage unit 815, an application unit 817, and an interface unit 819.

The collection unit 801 collects shape data associated with a class. In this example, the collection unit 801 also converts measurement data obtained from the planar scan sensor 101 into shape data. The order in which measurement is performed has been identified in the sample. The sample storage unit 803 stores data of samples (shape data, classes, and feature vectors).

The calculation unit 805 calculates feature vectors based on the shape data. The parameter storage unit 806 stores various parameters. The learning unit 807 performs a learning process by using a class and feature vectors included in a sample as learning data, and generates a classifier for distinguishing a class based on the feature vectors. The model data storage unit 809 stores model data for identifying a classifier. The acquisition unit 811 acquires measurement data from the planar scan sensor 101. The conversion unit 813 converts measurement data into shape data. The feature vector storage unit 815 stores feature vectors. The application unit 817 applies feature vectors to a classifier to thereby distinguish a class. The interface unit 819 delivers the distinguished class as the type of touch to a higher level module than the interface unit 819.

The collection unit 801, the calculation unit 805, the learning unit 807, the acquisition unit 811, the conversion unit 813, the application unit 817, and the interface unit 819 that are described above are implemented using hardware resources (for example, FIG. 32) and programs causing a processor to execute processes to be described later.

Figure 32:
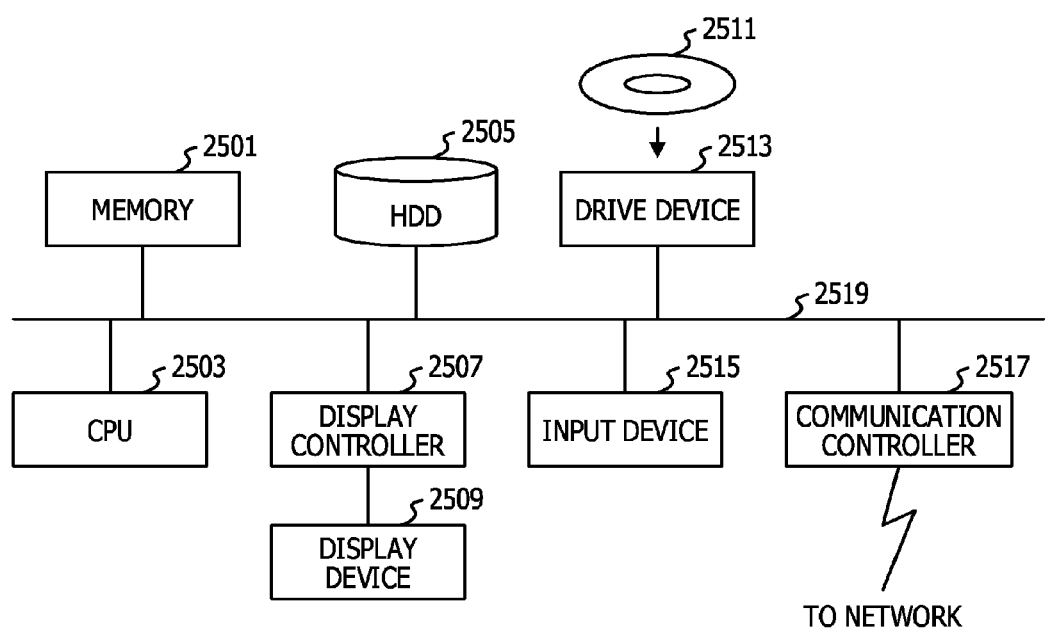
FIG. 32 is a functional block diagram of a computer.

The sample storage unit 803, the parameter storage unit 806, and the model data storage unit 809, and the feature vector storage unit 815 that are described above are implemented using hardware resources (for example, FIG. 32).

Figure 9:
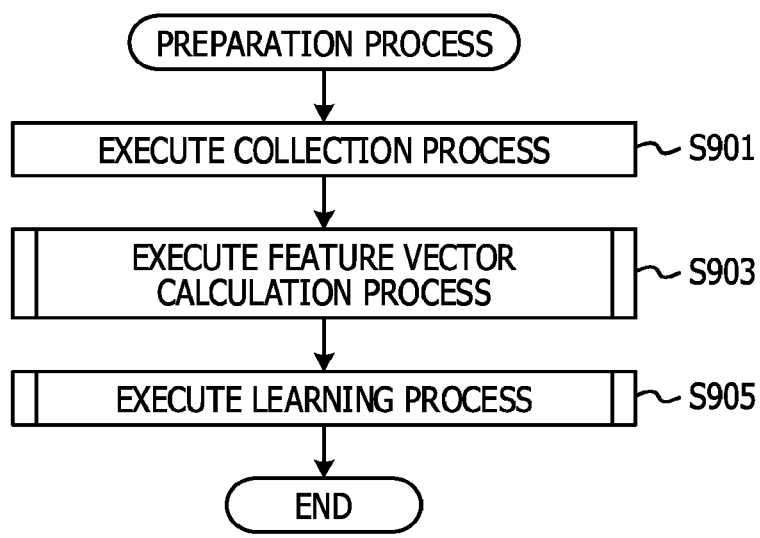
FIG. 9 is a diagram illustrating a preparation process.

Subsequently, processes performed by the control device 701 will be described. FIG. 9 illustrates a flow of a preparation process. Classifiers are generated in the preparation process.

The collection unit 801 executes a collection process (S901). In the collection process, the collection unit 801 collects pieces of shape data each assigned a class. Specifically, angles and distances in the measurement data obtained from the planar scan sensor 101 are converted into X:Y coordinates. The converted data corresponds to shape data in this example. For example, shape data based on a touch with one finger and shape data based on a touch with fingers may be collected simultaneously.

The calculation unit 805 executes a feature vector calculation process (S903). In the feature vector calculation process, the calculation unit 805 calculates feature vectors in each sample. The feature vector calculation process will be described later by using FIGS. 10 to 29.

After calculating the feature vectors, the learning unit 807 executes a learning process (S905). In the learning process, the learning unit 807 obtains classifiers for judging the type of touch based on the samples. After the learning process is complete, the preparation process is terminated.

Figure 10:
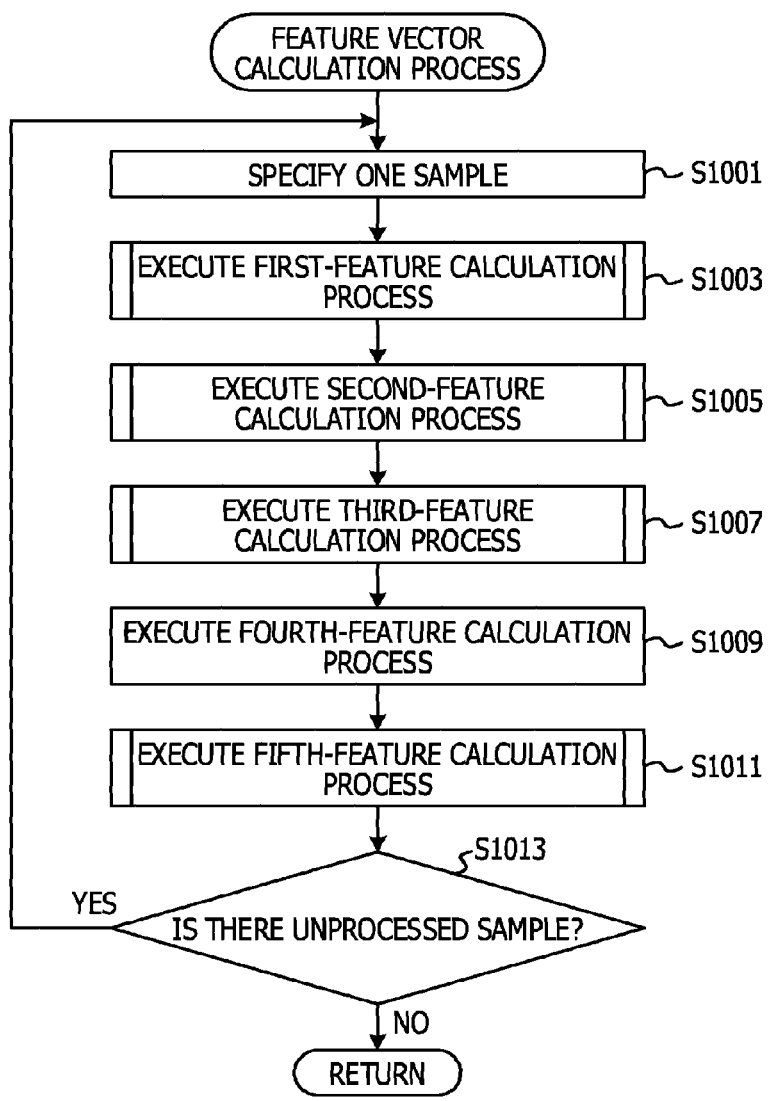
FIG. 10 is a flowchart illustrating a feature vector calculation process.

FIG. 10 illustrates a flow of the feature vector calculation process. The calculation unit 805 specifies a sample (S1001).

Figure 11:
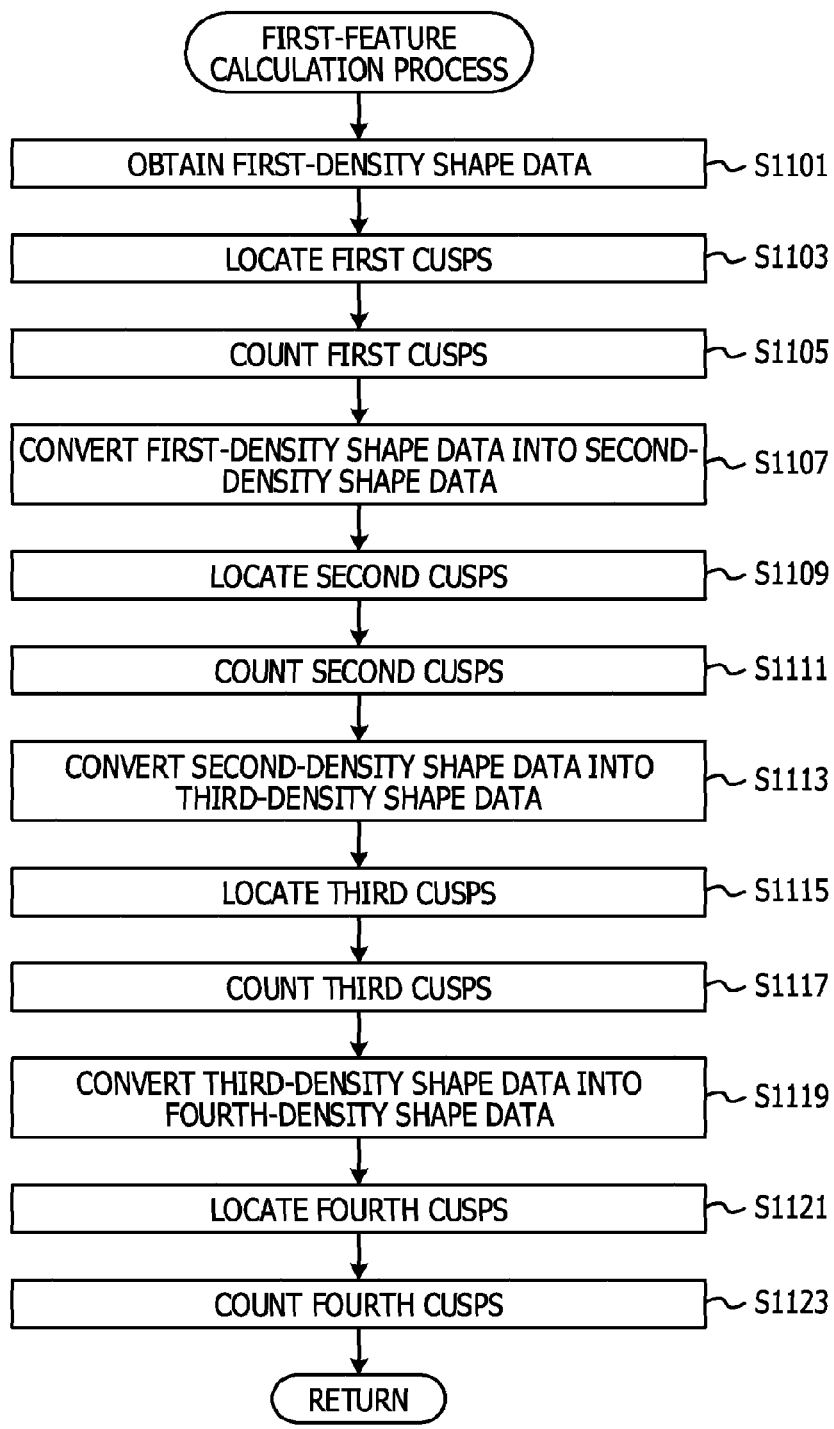
FIG. 11 is a flowchart illustrating a first-feature calculation process.

The calculation unit 805 executes a first-feature calculation process (S1003). In the first-feature calculation process, the calculation unit 805 obtains a first-cusp count, a second-cusp count, a third-cusp count, and a fourth-cusp count. A cusp is, for example, a jutting point and has an angle made with the two adjacent points that is smaller than a threshold. FIG. 11 illustrates a flow of the first-feature calculation process.

In the embodiment, not only the original shape data but also a plurality of pieces of shape data each having a smaller number of measurement points than the original shape data are generated. A cusp count is obtained based on each of the original shape data and the pieces of shape data. That is, cusp counts are individually obtained for the respective shapes represented using densities in a plurality of stages. In this example, densities in four stages are used to represent the shapes.

First, the calculation unit 805 obtains first-density shape data of the sample specified in S1001 (S1101). The calculation unit 805 locates first cusps in the first-density shape data (S1103) and counts the first cusps (S1105).

The first-density shape data is the original shape data included in the sample. Specifically, the first density represents the density of the measurement points in the original shape data. The first-cusp count is the number of cusps based on the first-density shape data.

Subsequently, the calculation unit 805 converts the first-density shape data into second-density shape data (S1107). The calculation unit 805 locates second cusps in the second-density shape data (S1109) and counts the located second cusps (S1111).

The second-density shape data is shape data obtained by decreasing the number of measurement points in the first-density shape data by a predetermined percentage. Specifically, the second density is a density lower than the first density. The second-cusp count is the number of cusps based on the second-density shape data.

Subsequently, the calculation unit 805 converts the second-density shape data into third-density shape data (S1113). The calculation unit 805 locates third cusps in the third-density shape data (S1115) and counts the located third cusps (S1117).

The third-density shape data is shape data obtained by decreasing the number of measurement points in the second-density shape data by a predetermined percentage. Specifically, the third density is a density lower than the second density. The third-cusp count is the number of cusps based on the third-density shape data.

Subsequently, the calculation unit 805 converts the third-density shape data into fourth-density shape data (S1119).

The calculation unit 805 locates fourth cusps in the fourth-density shape data (S1121) and counts the located fourth cusps (S1123).

The fourth-density shape data is shape data obtained by decreasing the number of measurement points included in the third-density shape data by a predetermined percentage. Specifically, the fourth density is a density lower than the third density. The fourth-cusp count is the number of cusps based on the fourth-density shape data.

The measurement points are serially thinned out in this manner, and the number of cusps appearing at each density is obtained. After the first-feature calculation process is complete, the process returns to the feature vector calculation process that has called the first-feature calculation process. Note that the first feature includes counts of two or more types of cusps. Accordingly, the first feature may have the first-cusp and second-cusp counts. In this case, the third-cusp count and the fourth-cusp count may not be obtained.

Figure 12:
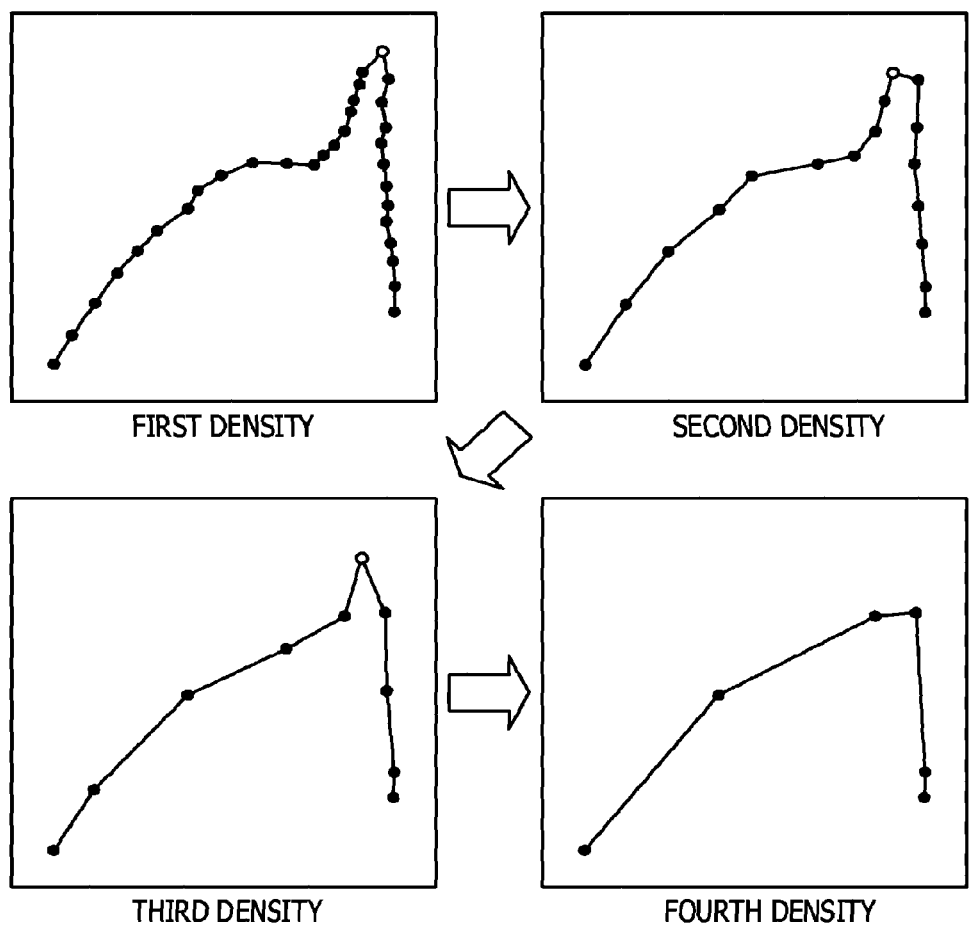
FIG. 12 is a diagram illustrating example cusps of a touch with one finger.

FIG. 12 illustrates example cusps based on a touch with one finger. In FIG. 12, measurement points corresponding to cusps are represented by outlined circles. Measurement points other than the cusps are represented by solid black circles. In the first-density shape data, one first cusp is located. Each first cusp in this example approximately represents the location of the finger used for the touch. Also in the second-density shape data, one second cusp is located. Further also in the third-density shape data, one third cusp is located. However, a fourth cusp does not appear in the fourth-density shape data. In this example, the first-cusp to third-cusp counts do not change.

Figure 13:
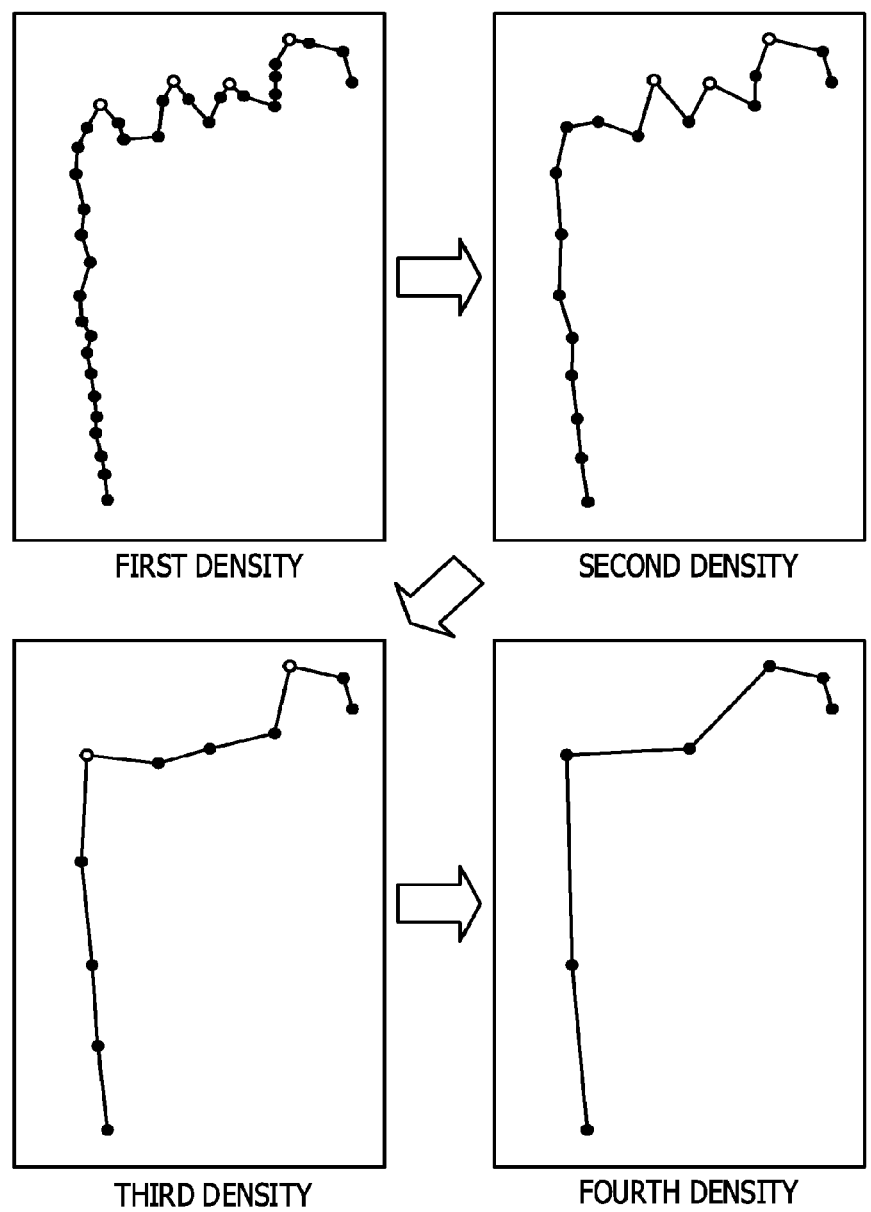
FIG. 13 is a diagram illustrating example cusps of a touch with fingers.

FIG. 13 illustrates example cusps based on a touch with fingers. In the first-density shape data, four first cusps are located. These first cusps also approximately represent the locations of the fingers used for the touch. In the second-density shape data, three second cusps are located. Further in the third-density shape data, two third cusps are located. However, fourth cusps do not appear in the fourth-density shape data. In this example, the number of cusps serially decreases from the first to fourth density.

Figure 14:
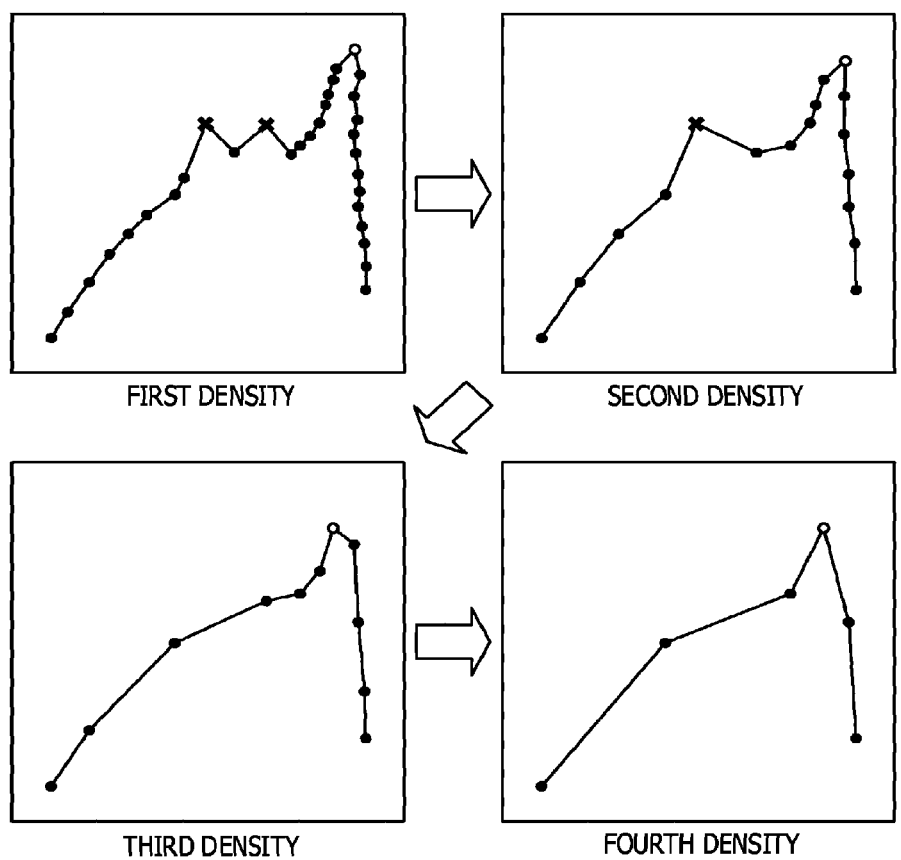
FIG. 14 is a diagram illustrating example cusps based on a touch with one finger.

FIG. 14 also illustrates example cusps based on the touch with one finger. However, the shape data in FIG. 14 is influenced by noise. In the first-density shape data, three first cusps are located. However, the rightmost first cusp only is generated by the finger used for the touch. The center and left first cusps are generated under the influence of noise. In this example, cusps generated under the influence of noise are represented by crosses. In the second-density shape data, two second cusps are located. In the third-density shape data, one third cusp is located. In the fourth-density shape data, one fourth cusp is located. In this example, the number of third cusps and the number of fourth cusps each correspond to the number of fingers actually used for the touch.

Figure 15:
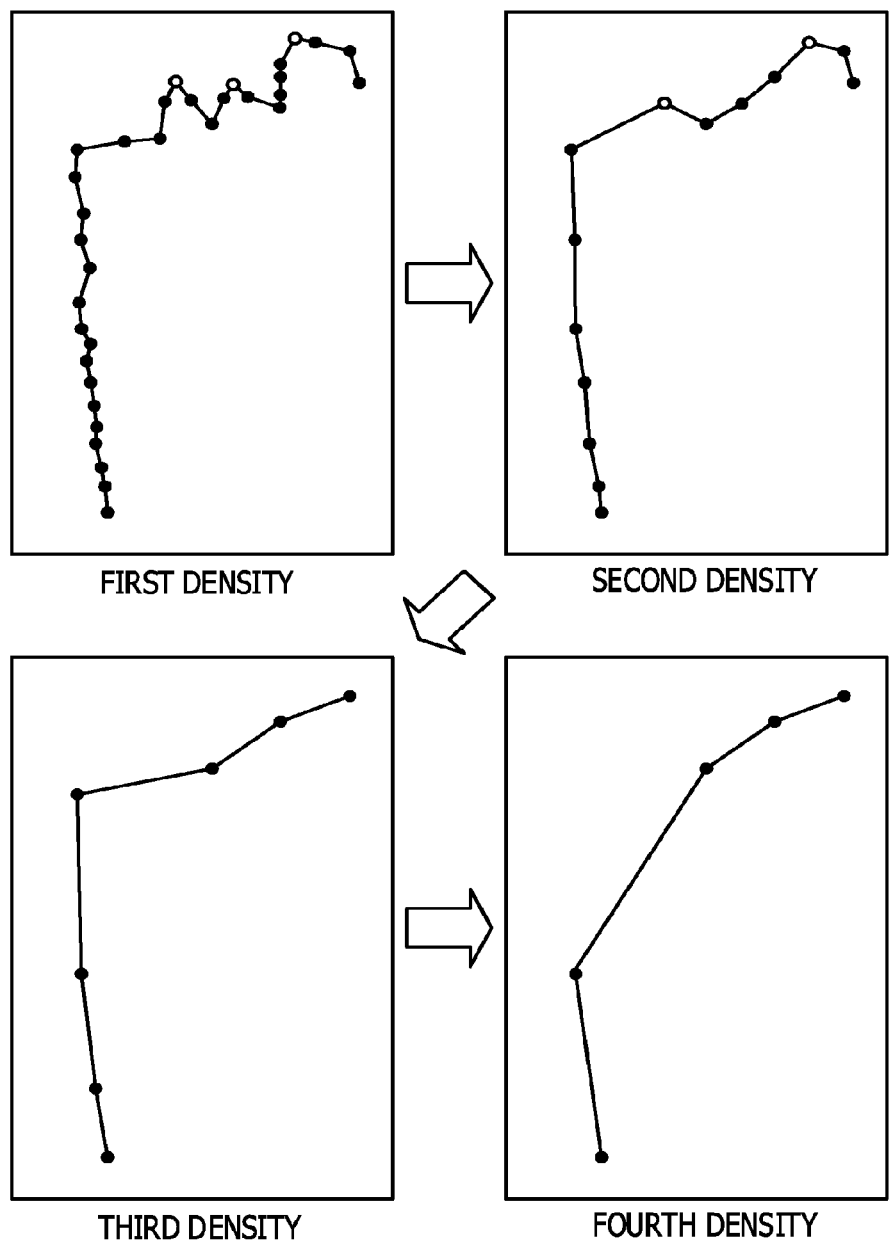
FIG. 15 is a diagram illustrating example cusps based on a touch with fingers.

FIG. 15 also illustrates example cusps based on the touch with fingers. However, the shape data in FIG. 15 is also influenced by noise. In the first-density shape data, three first cusps are located. Each first cusp approximately represents the location of a corresponding one of the fingers used for the touch. However, a first cusp corresponding to the leftmost finger used for the touch does not appear because the cusp is influenced by the noise. In the second-density shape data, two second cusps are located. In the third-density shape data, no third cusp appears. In the fourth-density shape data, no fourth cusp appears, either.

If the shape data of a hand used for the touch corresponds approximately to the actual shape of the hand, a cusp pattern in the shape data is the same as or corresponds approximately to the actual shape of the hand in many cases. For example, if learning is performed using the cusp patterns illustrated in FIGS. 12 to 15 as features, the learning contributes to the distinction of the approximate shape of a hand.

Referring back to FIG. 10, the calculation unit 805 executes a second-feature calculation process (S1005). In the second-feature calculation process, the calculation unit 805 obtains a distance between a cusp and a reference point.

Figure 16:
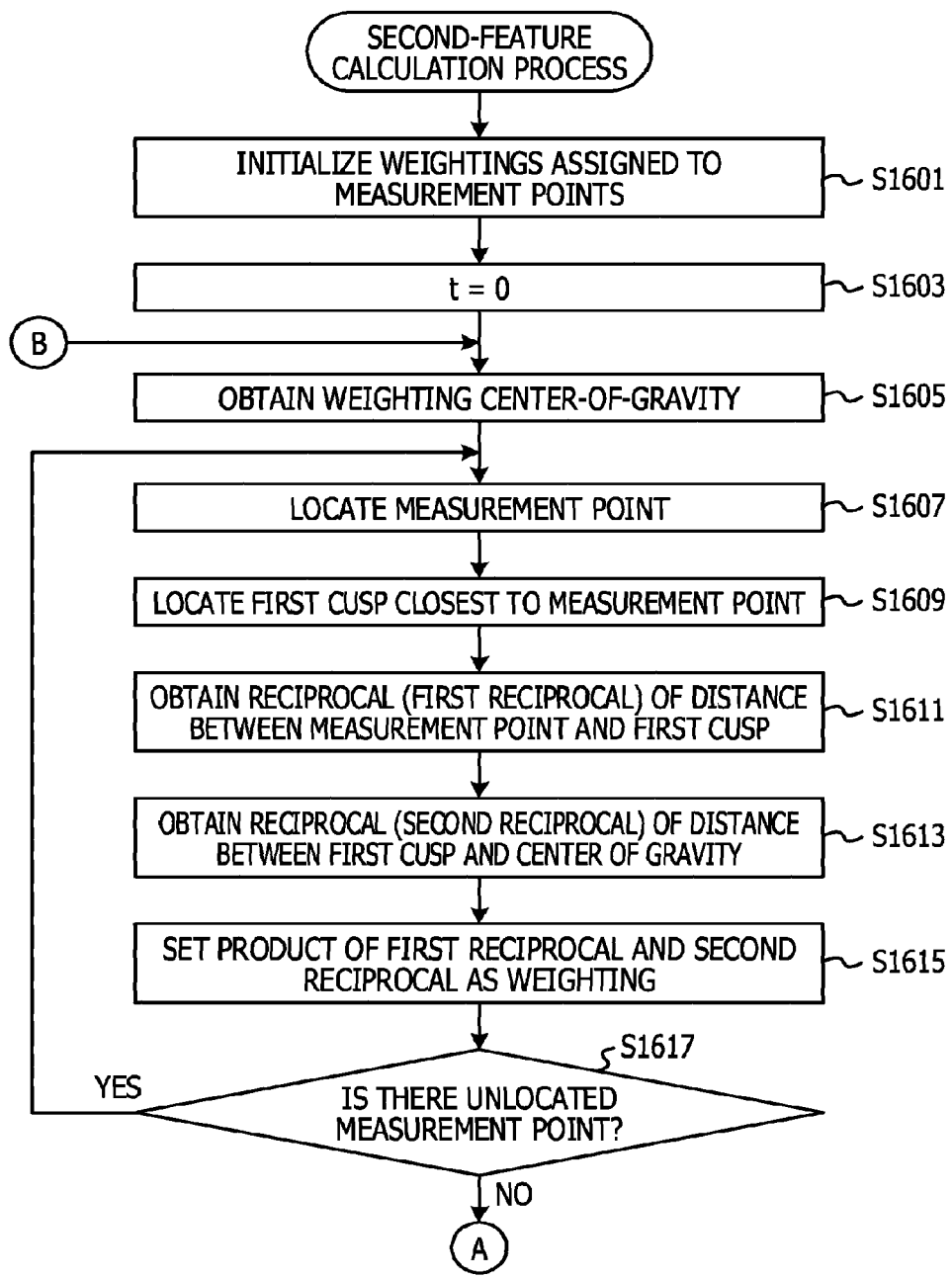
FIG. 16 is a flowchart illustrating a second-feature calculation process.

FIG. 16 illustrates a flow of the second-feature calculation process. In S1601 and subsequent steps, the calculation unit 805 first performs a process for locating a reference point. The reference point is located as the center of gravity of weightings (hereinafter, referred to as the weighting center-of-gravity).

Figure 17:
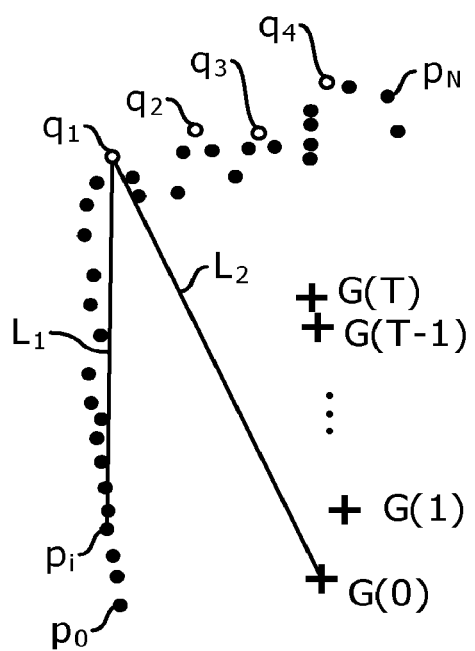
FIG. 17 is a diagram illustrating an example center of gravity of weighting.

FIG. 17 illustrates an example of the weighting center-of-gravity. In the embodiment, a weighting center-of-gravity G is obtained using weightings for measurement points $p_i$ (i=1, . . . , N). Since the weightings are equally assigned at the beginning, a center-of-gravity G(0) is first obtained in a general manner. Thereafter, the weighting of each measurement point $p_i$ is updated based on a distance $L_1$ between the measurement point $p_i$ and a cusp $q_1$ closest to the measurement point $p_i$ and on a distance $L_2$ between the cusp $q_1$ and the center-of-gravity G(0). A weighting center-of-gravity G(1) is then obtained. The update is repeated T times, and a weighting center-of-gravity G(T) is obtained. The weighting center-of-gravity G(T) is the reference point.

Referring back to FIG. 16, the calculation unit 805 initializes the weightings assigned to the respective measurement points (S1601). The weightings assigned to the respective measurement points are stored in the parameter storage unit 806. In this example, the weightings assigned to the respective measurement points are set to 1.

The calculation unit 805 sets a parameter t to 0 (S1603). The parameter t is stored in the parameter storage unit 806. The parameter t is used to count the number of times iteration is performed.

The calculation unit 805 obtains a weighting center-of-gravity G(t) of the measurement points $p_i$ (S1605). The weighting center-of-gravity is calculated by using a method in the related art.

The calculation unit 805 locates a measurement point $p_i$ included in the shape data (S1607). The calculation unit 805 locates a first cusp close to the measurement point $p_i$ of first cusps q (S1609). In this example, a first cusp q closest to the measurement point $p_i$ is located.

The calculation unit 805 obtains a reciprocal (referred to as a first reciprocal) of the distance $L_1$ between the measurement point $p_i$ and the first cusp q (S1611). The calculation unit 805 obtains a reciprocal (referred to as a second reciprocal) of the distance $L_2$ between the first cusp q and the center-of-gravity G(t) (S1613). The calculation unit 805 sets the product of the first reciprocal and the second reciprocal as the weighting of the measurement point (S1615). That is, the weighting for the measurement point is updated.

In S1607, the calculation unit 805 judges whether there is an unlocated measurement point $p_i$ (S1617). If it is judged that there is an unlocated measurement point $p_i$, the process returns to S1607, and the steps described above are repeated.

Figure 18:
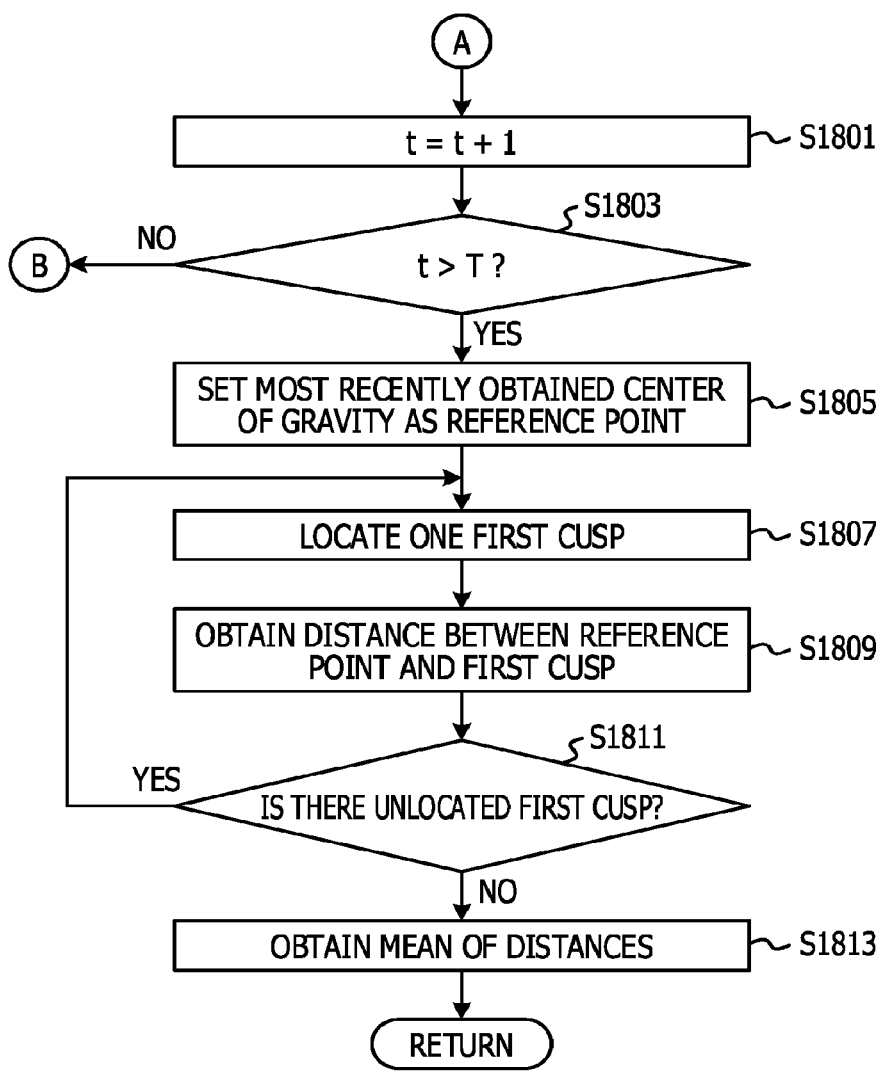
FIG. 18 is a flowchart illustrating the second-feature calculation process.

If it is judged that there is no unlocated measurement point $p_i$, the process moves to S1801 illustrated in FIG. 18 via a terminal A.

FIG. 18 will be described. The calculation unit 805 increments the parameter t by one (S1801). The calculation unit 805 judges whether the parameter t exceeds a predetermined value T (S1803). The predetermined value T is applied to the number of times iteration is performed. If it is judged that the parameter t does not exceed the predetermined value T, the process returns to S1605 illustrated in FIG. 16 via a terminal B.

If it is judged that the parameter t exceeds the predetermined value T, the calculation unit 805 sets, as the reference point, the weighting center-of-gravity G(T) obtained most recently (S1805).

Figure 19:
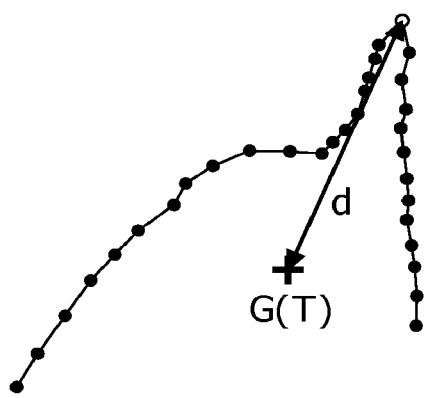
FIG. 19 is a diagram illustrating an example distance based on a touch with one finger.
Figure 20:
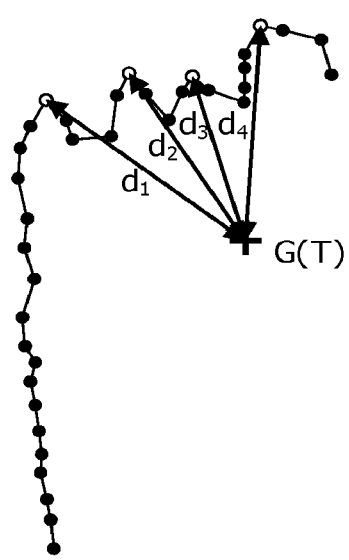
FIG. 20 is a diagram illustrating example distances based on a touch with fingers.

After S1807, the mean of distances between the reference point and the first cusps is calculated. FIG. 19 illustrates an example distance based on the touch with one finger. If there is one first cusp, a distance d from the reference point to the first cusp is used. FIG. 20 illustrates example distances based on the touch with fingers. If there are a plurality of first cusps, distances $d_1$ to $d_4$ each from the reference point to a corresponding one of the first cusps are obtained, and the mean of the distances is obtained.

Referring back to FIG. 18, the calculation unit 805 locates a first cusp (S1807). The calculation unit 805 obtains a distance between the reference point and the first cusp (S1809). The calculation unit 805 judges whether there is an unlocated first cusp in S1807 (S1811). If it is judged that there is an unlocated first cusp, the process returns to S1807, and steps described above are repeated.

If it is judged that there is no unlocated first cusp, the calculation unit 805 obtains the mean of the distances between the cusps and the reference point (S1813). After the second-feature calculation process is complete, the process returns to the feature vector calculation process that has called the second-feature calculation process.

Figure 21:
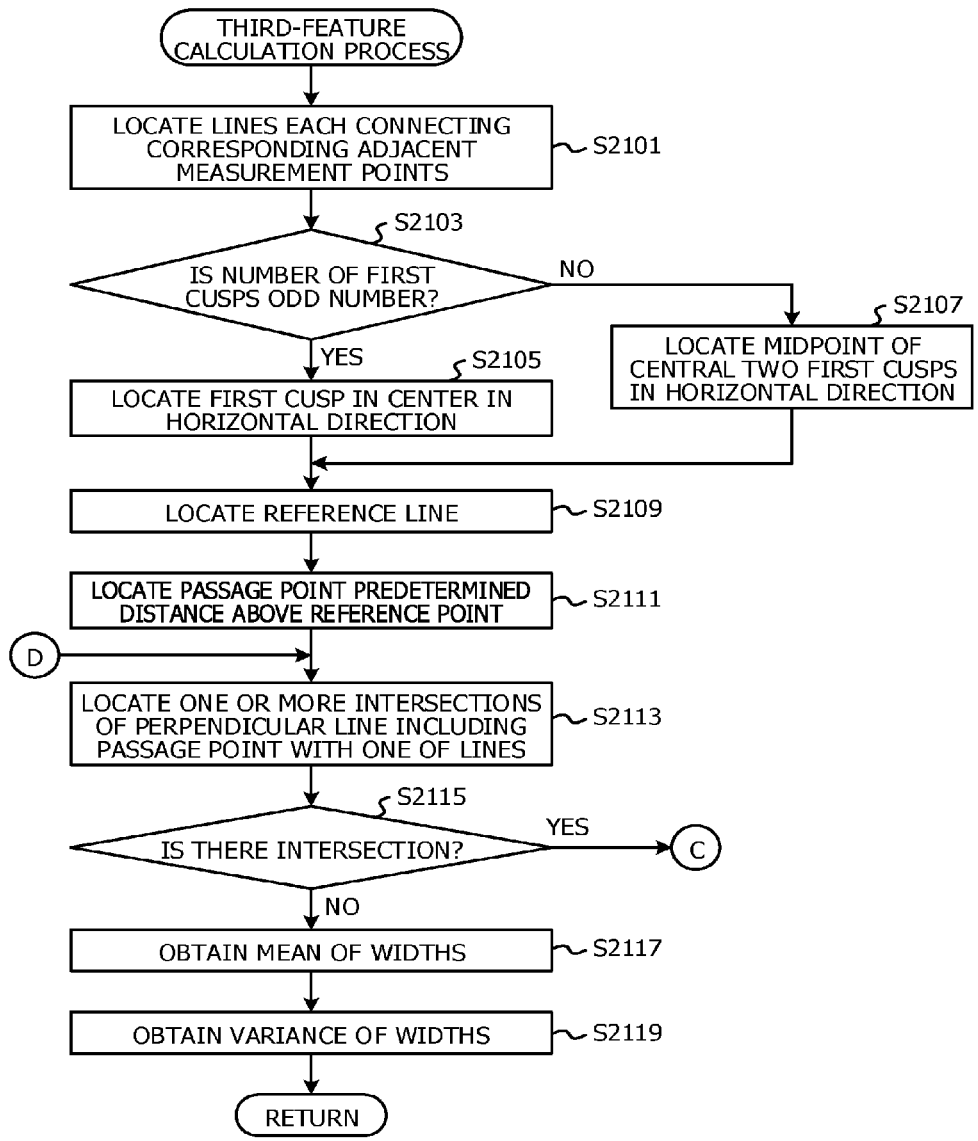
FIG. 21 is a flowchart illustrating a third-feature calculation process.

Referring back to FIG. 10, the calculation unit 805 subsequently executes a third-feature calculation process (S1007). FIG. 21 illustrates a flow of the third-feature calculation process. In the third-feature calculation process, the calculation unit 805 obtains the mean and the variance of widths of the one finger or the plurality of fingers used for the touch (hereinafter, simply referred to as widths). In S2101 and subsequent steps, the calculation unit 805 first performs a process for identifying the widths.

Figure 22:
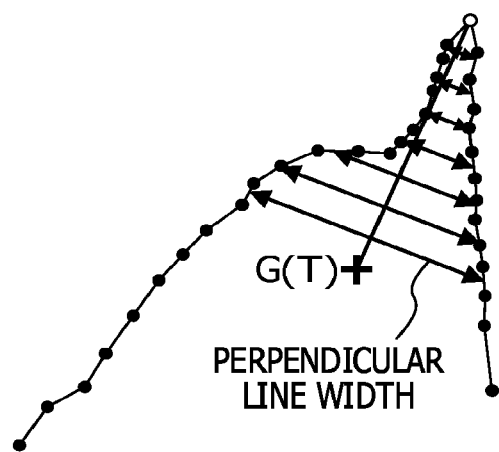
FIG. 22 is a diagram illustrating example widths of one finger used for a touch.

FIG. 22 illustrates example widths of one finger used for the touch. If there is one first cusp, passage points are provided on a line connecting the first cusp and the reference point, and widths corresponding to the lengths of lines orthogonally passing through the respective passage points are obtained. In this example, the passage points are equally spaced.

Figure 23:
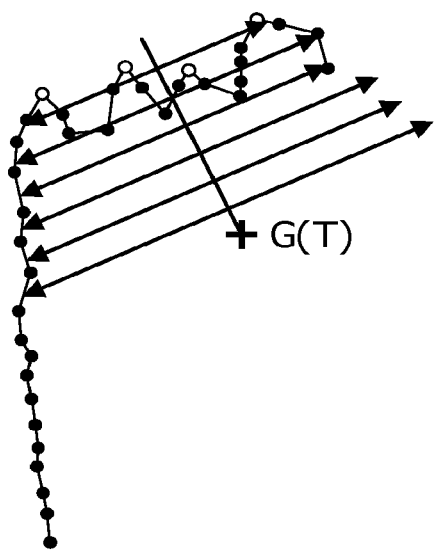
FIG. 23 is a diagram illustrating example widths of a plurality of fingers used for a touch.

FIG. 23 illustrates example widths of the plurality of fingers used for the touch. If there are an even number of first cusps, passage points are provided on a line connecting a midpoint of central two first cusps and the reference point, and widths corresponding to the lengths of lines orthogonally passing through the respective passage points are obtained. Also in this example, the passage points are equally spaced.

Referring back to FIG. 21, the calculation unit 805 first locates lines each connecting corresponding adjacent measurement points in accordance with the order of the measurement (S2101).

The calculation unit 805 judges whether the number of first cusps is an odd number (S2103). If the calculation unit 805 judges that the number of first cusps is an odd number, the calculation unit 805 locates a first cusp located in the center in a horizontal direction (S2105).

If the calculation unit 805 judges that the number of first cusps is not an odd number, that is, the number of first cusps is an even number, the calculation unit 805 locates a midpoint of central two first cusps in the horizontal direction (S2107).

The calculation unit 805 locates a reference line (S2109). Specifically, if the number of first cusps is an odd number, the calculation unit 805 sets a line connecting the aforementioned center first cusp and the reference point as the reference line. If the number of first cusps is an even number, the calculation unit 805 sets a line connecting the aforementioned midpoint and the reference point as the reference line.

The calculation unit 805 locates a passage point, on the reference line, located a predetermined distance above the reference point (S2111). The calculation unit 805 locates one or more intersections of a perpendicular line including the passage point with any one of the lines located in S2101 (S2113).

The calculation unit 805 judges whether there is an intersection (S2115). If the calculation unit 805 judges that there is an intersection, the process moves to S2401 illustrated in FIG. 24 via a terminal C.

Figure 24:
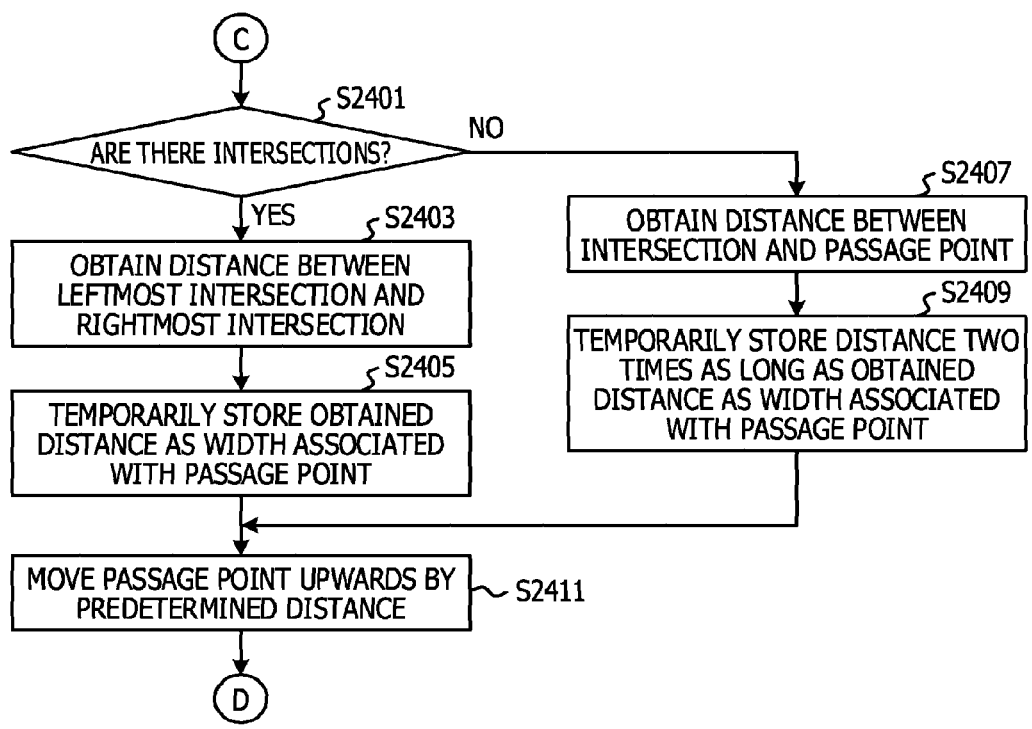
FIG. 24 is a flowchart illustrating the third-feature calculation process.

FIG. 24 will be described. The calculation unit 805 judges whether there are a plurality of intersections (S2401). If the calculation unit 805 judges that there is a plurality of intersections, the calculation unit 805 obtains a distance between the leftmost intersection and the rightmost intersection (S2403). The calculation unit 805 temporarily stores therein the distance as a width associated with the passage point (S2405).

If the calculation unit 805 judges that there is not a plurality of intersections, that is, if there is one intersection, the calculation unit 805 obtains a distance between the intersection and the passage point (S2407). The calculation unit 805 temporarily stores therein a distance two times as long as the distance as a width associated with the passage point (S2409).

After storing the width associated with the passage point, the calculation unit 805 moves the passage point upwards by the predetermined distance (S2411). The process returns to S2113 illustrated in FIG. 21 via a terminal D.

Referring back to FIG. 21, if the calculation unit 805 judges that there is no intersection in S2115, the calculation unit 805 obtains statistics of widths associated with the passage points. In this example, the calculation unit 805 obtains the mean of widths associated with the passage points (S2117). The calculation unit 805 further obtains the variance of the widths associated with the passage points (S2119). After the third-feature calculation process is complete, the process returns to the feature vector calculation process that has called the third-feature calculation process.

Figure 25:
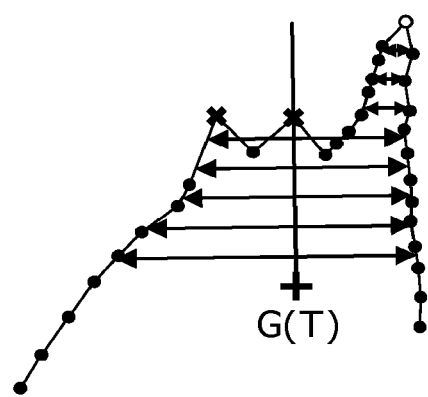
FIG. 25 is a diagram illustrating example widths of one finger used for a touch.

An example of widths influenced by noise will also be described. FIG. 25 illustrates example widths of one finger used for a touch. As described by using FIG. 14, the three first cusps are located. If there are three or more and an odd number of first cusps, passage points are provided on a line connecting the center cusp and the reference point, and widths corresponding to the lengths of lines orthogonally passing through the respective passage points are obtained. Also in this example, the passage points are equally spaced.

Figure 26:
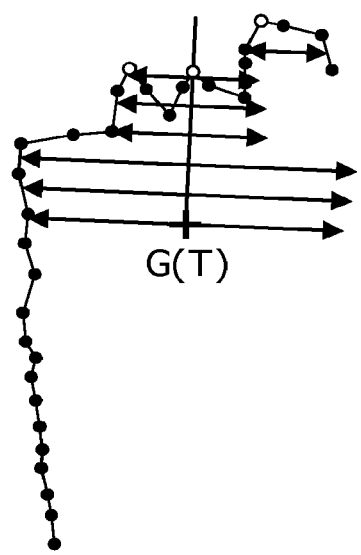
FIG. 26 is a diagram illustrating example widths of a plurality of fingers used for a touch.

FIG. 26 illustrates example widths of a plurality of fingers used for a touch. As described by using FIG. 15, the three first cusps are located. As in FIG. 25, passage points are provided on a line connecting the center cusp and the reference point, and widths corresponding to the lengths of lines orthogonally passing through the respective passage points are obtained.

If the shape data of a hand used for the touch corresponds approximately to the actual shape of the hand, the statistic of the widths described above also corresponds approximately to the actual shape of the hand. For example, if learning is performed using the cusp patterns illustrated in FIGS. 22, 23, 25, and 26 as features, the learning contributes to the distinction of the approximate shape of a hand.

Referring back to FIG. 10, the calculation unit 805 executes a fourth-feature calculation process (S1009). In the fourth-feature calculation process, the calculation unit 805 obtains a contour length. Specifically, the calculation unit 805 totals the lengths of the lines located in S2101. Alternatively, the calculation unit 805 may obtain a curve corresponding approximately to the lines connecting the measurement points and may thereby obtain the length of the curve.

Subsequently, the calculation unit 805 executes a fifth-feature calculation process (S1011). In the fifth-feature calculation process, the calculation unit 805 obtains the area and the aspect ratio of the smallest circumscribed quadrilateral.

Figure 27:
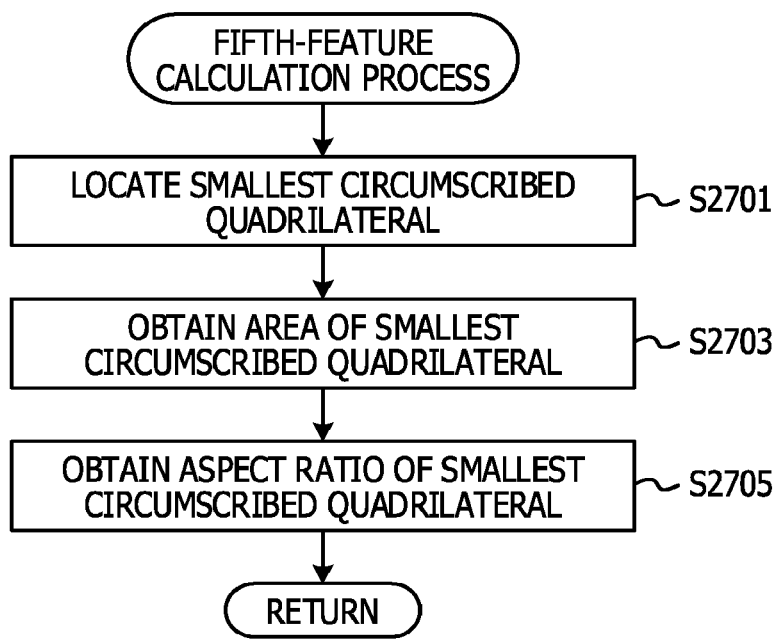
FIG. 27 is a flowchart illustrating a fifth-feature calculation process.

FIG. 27 illustrates a flow of the fifth-feature calculation process. The calculation unit 805 locates the smallest circumscribed quadrilateral of the circumscribed quadrilaterals having the measurement points included in the shape data (S2701). The smallest circumscribed quadrilateral is a circumscribed quadrilateral having the smallest area.

The calculation unit 805 obtains the area of the smallest circumscribed quadrilateral (S2703). The calculation unit 805 further obtains the aspect ratio of the smallest circumscribed quadrilateral (S2705). After the fifth-feature calculation process is complete, the process returns to the feature vector calculation process that has called the fifth-feature calculation process.

Figure 28:
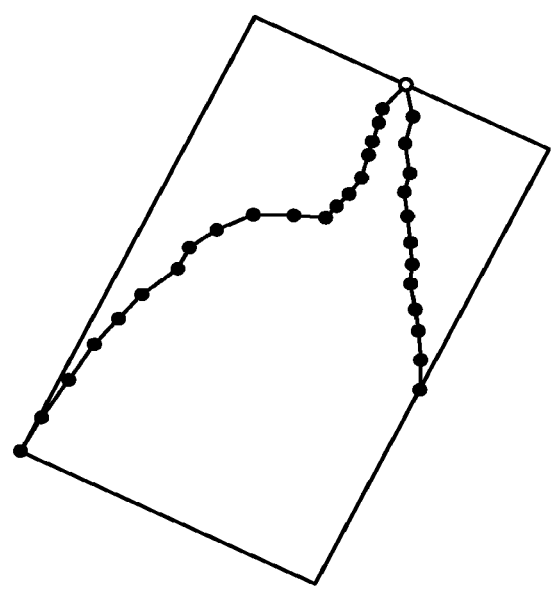
FIG. 28 is a diagram illustrating an example of the smallest circumscribed quadrilateral based on a touch with one finger.
Figure 29:
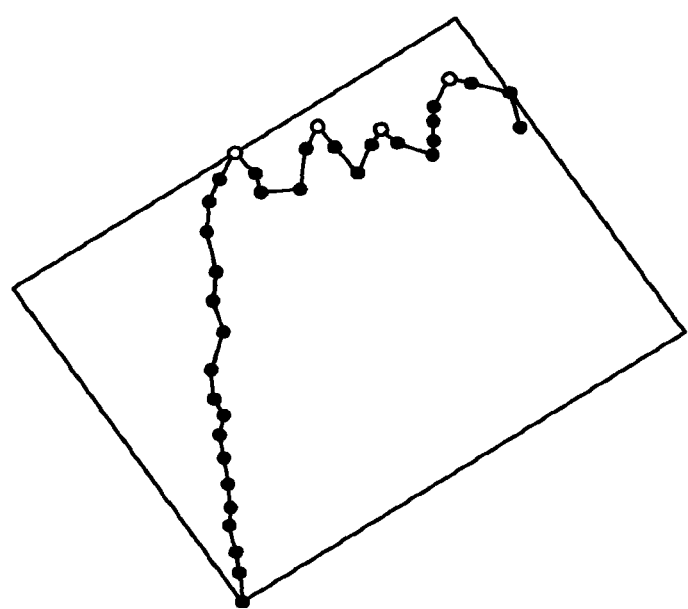
FIG. 29 is a diagram illustrating an example of the smallest circumscribed quadrilateral based on a touch with fingers.

FIG. 28 illustrates an example of the smallest circumscribed quadrilateral based on the touch with one finger. FIG. 29 illustrates an example of the smallest circumscribed quadrilateral based on the touch with fingers. As described above, the area of the smallest circumscribed quadrilateral based on the touch with one finger is smaller than the area of the smallest circumscribed quadrilateral based on the touch with fingers in many cases. The aspect ratio of the smallest circumscribed quadrilateral based on the touch with one finger is larger than the aspect ratio of the smallest circumscribed quadrilateral based on the touch with fingers in many cases.

Referring back to FIG. 10, after the fifth-feature calculation process is complete, the calculation unit 805 judges whether there is an unprocessed sample (S1013). If the calculation unit 805 judges that there is an unprocessed sample, the process returns to S1001 and repeats the steps described above.

If the calculation unit 805 judges that there is no unprocessed sample, the feature vector calculation process is terminated, and the process returns to the preparation process that has called the feature vector calculation process. The feature vector calculation process has heretofore been described.

Figure 30:
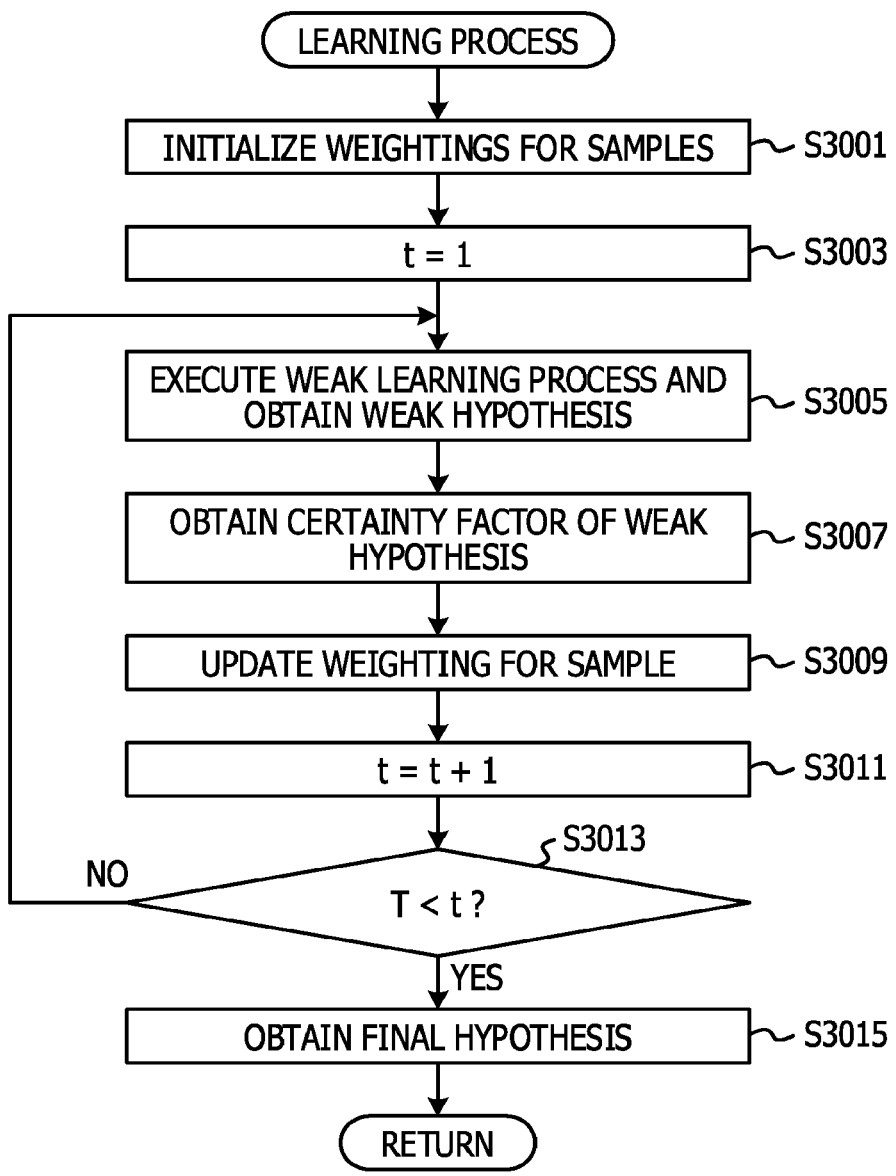
FIG. 30 is a flowchart illustrating a learning process.

Subsequently, the learning process illustrated in S905 in FIG. 9 will be described. FIG. 30 illustrates a flow of the learning process. In this example, learning based on the AdaBoost algorithm is performed. However, any learning algorithm may be used. AdaBoost is related art and is thus described just briefly.

Classifiers for determining classes from feature vectors are generated based on the learning. In this example, a value of 0 for a class represents a touch with one finger, and a value of 1 represents a touch with fingers. A feature vector and a class are herein represented by x and y, respectively.

A sample (a set of a feature vector x and a class y) corresponds to learning data. The learning data herein includes m samples and is expressed as $\{(x_1, y_1), \ldots, (x_m, y_m)\}$.

The learning unit 807 initializes weightings for samples (S3001). The initial value of each weighting for a corresponding one of the samples is 1/m.

The learning unit 807 sets a counter t to 1 (S3003).

The learning unit 807 executes a weak learning process and obtains a weak hypothesis (S3005). Specifically, the learning unit 807 causes a weak learner to obtain a weak hypothesis $h_t$. The weak learner learns the weak hypothesis $h_t$ by using the samples and the weightings $(w_{t,1}, \ldots w_{t,m})$. For example, a perceptron is used as the weak learner.

The learning unit 807 calculates a certainty factor $\alpha_t$ of the weak hypothesis $h_t$ (S3007). The learning unit 807 updates the weighting for the sample based on the certainty factor $\alpha_t$ (S3009).

Subsequently, the learning unit 807 increments the counter t by one (S3011) and judges whether the counter t exceeds a repeat count T (S3013). If the learning unit 807 judges that the counter t does not exceed the repeat count T, the learning unit 807 returns to S3005 and repeats the steps described above.

If the learning unit 807 judges that the counter t exceeds the repeat count T, the learning unit 807 obtains the final hypothesis (S3015). Specifically, the learning unit 807 calculates a final hypothesis F obtained by coupling the weak hypotheses $h_t$ based on the certainty factor $\alpha_t$. At this time, model data thus obtained is stored in the model data storage unit 809. The model data includes pieces of data for identifying the respective weak hypotheses $h_t$ and a piece of data for defining the coupling of the weak hypotheses $h_t$. The learning process has heretofore been described.

Subsequently, a main process will be described. The main process described below is executed when a program (hereinafter, referred to as a high-level module) for performing a process in response to an event associated with the type of touch is run. The high-level module is, for example, an operating system or an application program.

Figure 31:
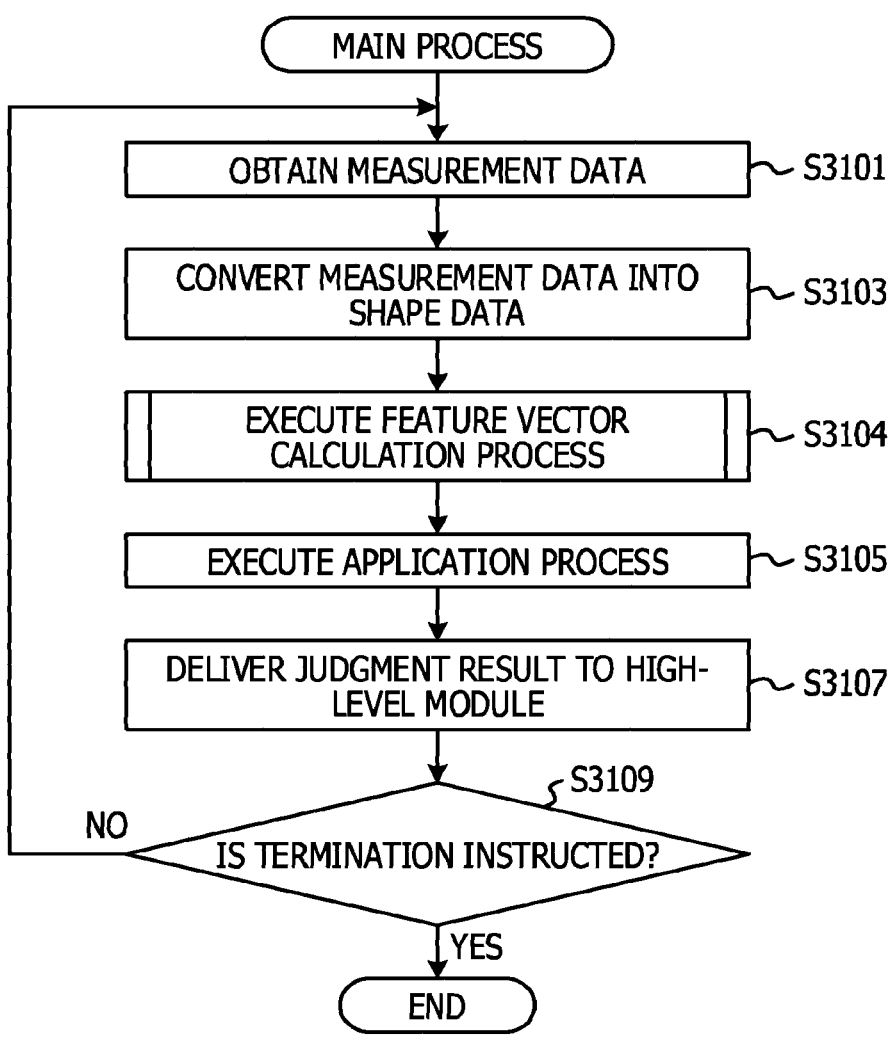
FIG. 31 is a flowchart illustrating a main process.

FIG. 31 illustrates a flow of the main process. The acquisition unit 811 obtains measurement data from the planar scan sensor 101 (S3101). The measurement data indicates the detection location of an object based on angles and distances. The conversion unit 813 converts the measurement data into the shape data (S3103). The shape data indicates the detection location of the object based on the X:Y coordinates.

The calculation unit 805 executes the feature vector calculation process (S3104). In the feature vector calculation process, the calculation unit 805 calculates feature vectors in the shape data. The feature vectors are stored in the feature vector storage unit 815.

The application unit 817 executes an application process based on the model data (S3105). In the application process, the application unit 817 judges a class by using the classifier corresponding to the final hypothesis F based on the feature vectors calculated in S3104. The class corresponds to the type of touch.

The interface unit 819 delivers the judgment result, that is, the type of touch to the high-level module (S3107). The interface unit 819 judges whether termination is instructed (S3109). If the interface unit 819 judges that termination is not instructed, the process returns to S3101 and repeats the steps described above.

If the interface unit 819 judges that termination is instructed, the main process is terminated.

According to the embodiment, a classifier for more correctly distinguishing the type of touch based on a result of measurement performed on the flat surface near the display surface 103 may be generated. In addition, when the first feature is focused on, an aspect of the embodiment is that the features of a minute shape and a rough shape may be reflected on the classifier.

Further, when the second feature is focused on, an aspect of the embodiment is that the feature attributable to the number and the location of minute cusps may be reflected on the classifier.

Further, when the third feature is focused on, an aspect of the embodiment is that statistic features of widths may be reflected on the classifier.

Further, when the fourth feature is focused on, an aspect of the embodiment is that a feature of shape complexity may be reflected on the classifier.

Further, when the fifth feature is focused on, an aspect of the embodiment is that, for example, a feature of how fingers are spread may be reflected on the classifier.

The embodiment has heretofore been described but is not limited to this. For example, the aforementioned functional block configuration does not match a program module configuration in some cases.

In addition, the configuration of storage areas described above is an example and does not necessarily have to be adopted. Further, also in a process flow, as long as a process result is not changed, the order of steps in the process may be changed, and a plurality of steps may be executed in parallel.

Note that the control device 701 described above is a computer. As illustrated in FIG. 32, a memory 2501, a central processing unit (CPU) 2503, a hard disk drive (HDD) 2505, a display controller 2507 that is connected to a display device 2509, a drive device 2513 for a removable disk 2511, an input device 2515, and a communication controller 2517 for connecting to a network are connected to each other via a bus 2519. The operating system (OS) and application programs for performing the processes in the embodiment are stored in the HDD 2505. When being run by the CPU 2503, the application programs are read from the HDD 2505 and loaded in the memory 2501. The CPU 2503 controls the display controller 2507, the communication controller 2517, and the drive device 2513 in accordance with the content of the process of a corresponding one of the application programs and causes these components to perform predetermined operations. Data in the course of the process is mainly stored in the memory 2501 but may be stored in the HDD 2505. In the embodiment, the application programs for performing the aforementioned processes are distributed in a state of being stored in the computer-readable removable disk 2511 and are installed from the drive device 2513 onto the HDD 2505. In another case, the application programs are installed on the HDD 2505 via a network such as the Internet and the communication controller 2517. Such a computer implements the various functions as described above in organic cooperation with the hardware such as the CPU 2503 and the memory 2501 that are described above, the OS, and programs such as the application programs.

The embodiment described above is summarized as follows.

A generation method according to the embodiment includes a process including (A) calculating the number of one or more first cusps in a first shape having a series of points where the location of an object near a display surface is two dimensionally measured, (B) calculating the number of one or more second cusps in a second shape in which the measured points in the first shape are thinned out, and (C) generating a classifier for distinguishing, based on a set of samples including the number of first cusps and the number of second cusps, the type of touch for identifying the shape of a hand used for touching the display surface.

This may distinguish the type of touch on the display surface more correctly. In addition, an aspect of the embodiment is that the feature of the minute shape and the feature of the rough shape may be reflected on the classifier.

The generation method may further include a process including (D) calculating, for each measured point, a next center of gravity after weighting by using, as a weighting, the product of the first reciprocal of a distance between the point and a first cusp close to the point and the second reciprocal of a distance between the center of gravity and the first cusp and repeating updating the center of gravity and (E) calculating the mean of distances between the first cusps and the center of gravity calculated most recently. In this case, the samples may include the mean of the distances.

This enables the feature attributable to the number and the location of cusps to be reflected on the classifier.

The generation method may further include a process including (F) calculating a plurality of widths in the first shape at regular intervals and (G) calculating the mean and the variance of the plurality of widths. In this case, the samples may include the mean and the variance.

This enables statistic features of widths to be reflected on the classifier.

The generation method may further include a process including calculating the length of a contour line in the first shape. In this case, the samples may include the length.

This enables a feature of shape complexity to be reflected on the classifier.

The generation method may further include a process including (H) identifying the smallest circumscribed quadrilateral in the first shape and (I) calculating the area and the aspect ratio of the circumscribed quadrilateral. In this case, the samples may include the area and the aspect ratio.

This enables, for example, a feature of how fingers are spread to be reflected on the classifier.

A generation method according to the embodiment includes a process including (A) calculating the number of one or more first cusps in a first shape having a series of points where the location of an object near a display surface is two dimensionally measured, (B) calculating the number of one or more second cusps in a second shape in which the measured points in the first shape are thinned out, and (C) distinguishing, based on the number of first cusps and the number of second cusps, the type of touch for identifying the shape of a hand used for touching the display surface.

The use of the classifier described above enables the type of touch on the display surface to be distinguished more correctly.

Note that a program for causing a computer to perform the processes using the methods may be generated. The program may be stored in a storage device or a computer-readable storage medium such as a flexible disk, a compact disc read-only memory (CD-ROM), a magneto-optical disk, a semiconductor memory, and a hard disk. An intermediate result of each process is generally temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A learning method executed by a computer, the learning method comprising:

collecting, from a sensor that measures a distance and a direction to an object, measurement data regarding a plurality of points forming the object;

generating, based on the measurement data, first shape data indicating a shape of the object;

calculating a number of first cusps in the first shape data, the first cusps corresponding to cusps of the object;

generating second shape data in which the shape is simplified by removing a part of the plurality of points from the measurement data;

calculating a number of second cusps in the second shape data; and generating learning information based on the number of the first cusps and the number of the second cusps, the learning information classifying a type of the shape of the object into one of a plurality of types.

2. The learning method according to claim 1, wherein the object is a hand, and
the first cusps and the second cusps correspond to fingers of the hand.

3. The learning method according to claim 2, wherein the plurality of types is types indicating the shape of the hand touching a display surface which displays an image.

4. The learning method according to claim 3, wherein the plurality of types include a type indicating one extended finger of the hand and another type indicating a plurality of spread fingers of the hand.

5. The learning method according to claim 1, wherein the sensor measures a planar distance and the direction to the object.

6. The learning method according to claim 1, further comprising:

determining, as a weighting value, a product of a first reciprocal of a first distance between a first point of the plurality of points and one of the first cusps that is close to the first point and a second reciprocal of a second distance between a center of gravity of the plurality of points and the one first cusp;

repeating an update process in which a next center of gravity after weighting is calculated based on the weighting value; and calculating an average of distances between the first cusps and a center of gravity calculated most recently.

7. The learning method according to claim 6, wherein the learning information includes the average of the distances.

8. The learning method according to claim 1, further comprising:

calculating a plurality of widths in the first shape data at regular intervals; and calculating an average of the plurality of widths and a variance of the plurality of widths.

9. The learning method according to claim 8, wherein the learning information includes the average and the variance.

10. The learning method according to claim 1, further comprising:

calculating a length of a contour line in the first shape data.

11. The learning method according to claim 10, wherein the learning information includes the length.

12. The learning method according to claim 1, further comprising:
identifying a smallest circumscribed quadrilateral in the first shape data; and
calculating an area and an aspect ratio of the smallest circumscribed quadrilateral.

13. The learning method according to claim 12, wherein the learning information includes the area and the aspect ratio.

14. A method executed by a computer, the method comprising:
collecting, from a sensor that measures a distance and a direction to an object, measurement data regarding a plurality of points forming the object;
generating, based on the measurement data, first shape data indicating a shape of the object;
calculating a number of first cusps in the first shape data, the first cusps corresponding to cusps of the object;
generating second shape data in which the shape is simplified by removing a part of the plurality of points from the measurement data;
calculating a number of second cusps in the second shape data;
determining one type of the shape of the object from among a plurality of types based on the number of the first cusps and the number of the second cusps; and
outputting the one type to a program that executes a process in response to an event associated with the one type.

15. An information processing apparatus comprising:
a memory; and
a processor coupled to the memory and configured to:
collect, from a sensor that measures a distance and a direction to an object, measurement data regarding a plurality of points forming the object,
generate, based on the measurement data, first shape data indicating a shape of the object,
calculate a number of first cusps in the first shape data, the first cusps corresponding to cusps of the object,
generate second shape data in which the shape is simplified by removing a part of the plurality of points from the measurement data,
calculate a number of second cusps in the second shape data, and
generate learning information based on the number of the first cusps and the number of the second cusps, the learning information classifying a type of the shape of the object into one of a plurality of types.

16. The information processing apparatus according to claim 15, wherein
the object is a hand, and
the first cusps and the second cusps correspond to fingers of the hand.

17. The information processing apparatus according to claim 16, wherein the plurality of types is types indicating the shape of the hand touching a display surface which displays an image.

18. The information processing apparatus according to claim 17, wherein the plurality of types include a type indicating one extended finger of the hand and another type indicating a plurality of spread fingers of the hand.

19. The information processing apparatus according to claim 15, wherein the sensor measures a planar distance and the direction to the object.

20. The information processing apparatus according to claim 15, wherein the processor is configured to:
determine, as a weighting value, a product of a first reciprocal of a first distance between a first point of the plurality of points and one of the first cusps that is close to the first point and a second reciprocal of a second distance between a center of gravity of the plurality of points and the one first cusp,
repeat an update process in which a next center of gravity after weighting is calculated based on the weighting value, and
calculate an average of distances between the first cusps and a center of gravity calculated most recently.

* * * * *